(12) United States Patent
Hiranaka

(10) Patent No.: US 9,595,196 B1
(45) Date of Patent: Mar. 14, 2017

(54) MINE MANAGEMENT SYSTEM AND MINE MANAGING METHOD

(71) Applicant: Komatsu Ltd., Tokyo (JP)

(72) Inventor: Takashi Hiranaka, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/917,372

(22) PCT Filed: Oct. 30, 2015

(86) PCT No.: PCT/JP2015/080845
§ 371 (c)(1),
(2) Date: Mar. 8, 2016

(87) PCT Pub. No.: WO2016/039489
PCT Pub. Date: Mar. 17, 2016

(51) Int. Cl.
*G06F 7/70* (2006.01)
*G08G 1/16* (2006.01)
(Continued)

(52) U.S. Cl.
CPC .............. *G08G 1/164* (2013.01); *E21F 13/00* (2013.01); *G05D 1/0088* (2013.01); *G05D 1/0278* (2013.01); *G05D 2201/021* (2013.01)

(58) Field of Classification Search
CPC ....... G08G 1/164; E21F 13/00; G05D 1/0088; G05D 1/0278; G05D 2201/021
(Continued)

(56) References Cited

U.S. PATENT DOCUMENTS 5,987,379 A 11/1999 Smith
8,378,608 B2 * 2/2013 Robertson ........... H02M 5/4505
318/438
(Continued)

FOREIGN PATENT DOCUMENTS

AU 2013337237 A1 2/2015
JP 2000-315112 A 11/2000
(Continued)

OTHER PUBLICATIONS

International Search Report mailed Dec. 8, 2015, issued for PCT/JP2015/080845.
(Continued)

*Primary Examiner* — Shardul Patel
(74) *Attorney, Agent, or Firm* — Locke Lord LLP

(57) ABSTRACT

A mine management system for a mine where an unmanned vehicle operates in an operation area of the mine, includes an exit determination unit determining based on position data of a moving body different from the unmanned vehicle whether the moving body exits the operation area, an abnormality monitoring unit ending monitoring abnormality of the moving body based on manipulation on an input device installed in the moving body, an entrance prohibited area setting unit setting an entrance prohibited area where entrance of the unmanned vehicle is prohibited so that the entrance prohibited area includes a position of the moving body and expands the entrance prohibited area when the abnormality is detected by the abnormality monitoring, and an alarm device control unit activating an alarm device installed in the moving body when it is determined that the moving body exits the operation area and the input device is not manipulated.

6 Claims, 12 Drawing Sheets

(51) Int. Cl.
*E21F 13/00* (2006.01)
*G05D 1/00* (2006.01)
*G05D 1/02* (2006.01)

(58) Field of Classification Search
USPC .................................. 701/23, 50; 340/438
See application file for complete search history.

(56) References Cited

U.S. PATENT DOCUMENTS

2007/0293996 A1* 12/2007 Mori .................... G01C 21/005
  701/23
2014/0297091 A1* 10/2014 Itoi ....................... E02F 9/2054
  701/24
2016/0224029 A1*  8/2016 Tojima ................. G05D 1/0278

FOREIGN PATENT DOCUMENTS

| JP | 2007-164280 A | 6/2007 |
| JP | 2010-016582 A | 1/2010 |
| WO | WO-2015/015575 A1 | 2/2015 |

OTHER PUBLICATIONS

Office Action mailed Nov. 11, 2016, issued for the corresponding Australian patent application No. 2015310161.

* cited by examiner

MINE MANAGEMENT SYSTEM AND MINE MANAGING METHOD

FIELD

The present invention relates to a mine management system and a mine managing method.

BACKGROUND

As disclosed in Patent Literature 1, in a mine, in some cases, both of unmanned vehicles and manned vehicles operate. In addition, in the mine, workers also operate.

CITATION LIST

Patent Literature

Patent Literature 1: Japanese Laid-open Patent Publication No. 2000-315112

SUMMARY

Technical Problem

Unexpected interference may occur between unmanned vehicles and manned vehicles or workers. Therefore, a technique capable of ensuring safety of the manned vehicles or workers is desired to be contrived. On the other hand, if a safety function for ensuring the safety of the manned vehicles or the workers is excessively activated, there is a possibility that it results in reduction in productivity of the mine.

An object of an aspect of the present invention is to provide a mine management system and a mine managing method capable of suppressing reduction in productivity of the mine and ensuring safety of manned vehicles or workers.

Solution to Problem

According to a first aspect of the present invention, a mine management system for a mine where an unmanned vehicle operates in an operation area of the mine, comprises: an exit determination unit which determines based on position data of a moving body which is different from the unmanned vehicle whether or not the moving body exits the operation area; an abnormality monitoring unit which ends monitoring abnormality of the moving body based on manipulation on an input device installed in the moving body; an entrance prohibited area setting unit which sets an entrance prohibited area where entrance of the unmanned vehicle is prohibited so that the entrance prohibited area includes a position of the moving body and expands the entrance prohibited area when an abnormality is detected by the abnormality monitoring; and an alarm device control unit which activates an alarm device installed in the moving body when it is determined that the moving body exits the operation area and the input device is not manipulated.

According to a second aspect of the present invention, a mine managing method by a computer system for a mine where an unmanned vehicle operates in an operation area of the mine, comprises: acquiring position data of a moving body which is different from the unmanned vehicle; setting an entrance prohibited area where entrance of the unmanned vehicle is prohibited so that the entrance prohibited area includes a position of the moving body; determining based on the position data whether or not the moving body exits the operation area; acquiring a command signal generated based on manipulation on an input device installed in the moving body; ending monitoring abnormality of the moving body based on the command signal; expanding the entrance prohibited area when an abnormality is detected by the abnormality monitoring; and outputting a control signal of activating an alarm device installed in the moving body when it is determined that the moving body exits the operation area and the input device is not manipulated.

Advantageous Effects of Invention

According to the aspects of the present invention, provided are a mine management system and a mine managing method capable of suppressing reduction in productivity of the mine and ensuring safety of manned vehicles or workers.

DESCRIPTION OF EMBODIMENTS

Hereinafter, embodiments of the present invention will be described with reference to the drawings, but the present invention is not limited thereto. Components of the embodiments described hereinafter may be appropriately combined. In addition, some portions of the components may not be used.

<Overview of Mine>

Figure 1:
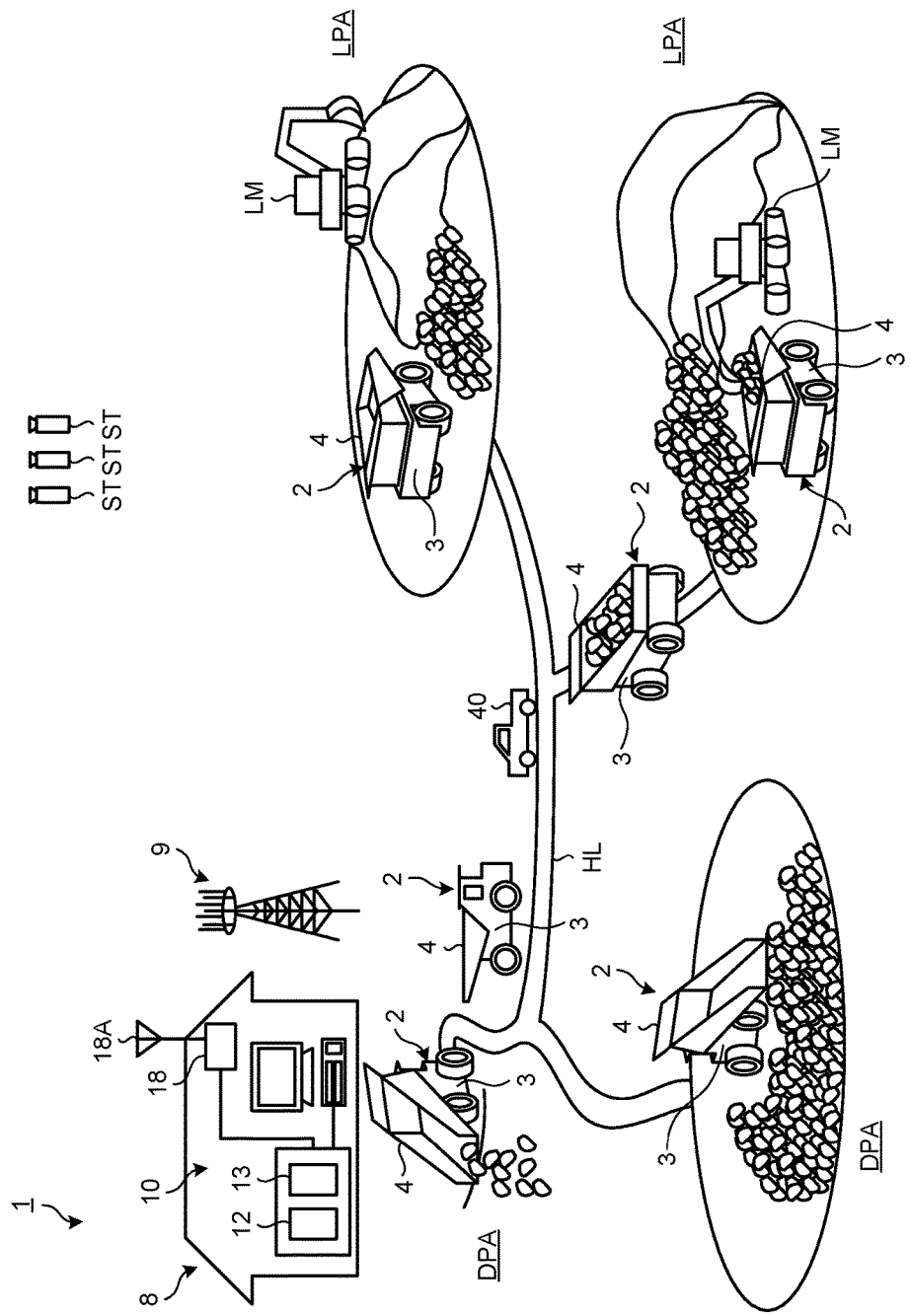
FIG. 1 is a schematic diagram illustrating an example of a mine according to an embodiment.

FIG. 1 is a schematic diagram illustrating an example of a mining site of a mine managed by a mine management system 1 according to an embodiment. The management system 1 manages the mine. In the mine, unmanned vehicles 2, manned vehicles 40, and workers operate. The mine management includes management of the unmanned vehicles 2, management of the manned vehicles 40, and the management of the workers.

As illustrated in FIG. 1, the management system 1 is installed in a control facility 8 of the mine and is configured to include a management device 10 including a computer system. The management device 10, the unmanned vehicles 2, and the manned vehicles 40 can perform wireless communication through a communication system 9. The unmanned vehicle 2 is operated based on command signals from the management device 10. No worker (driver) boards the unmanned vehicle 2. A worker (driver) boards the manned vehicle 40. In addition, the unmanned vehicle 2 may be manipulated by a driver who boards the unmanned vehicle 2. For example, in at least one of the case of parking the unmanned vehicle 2 into a parking site, the case of taking out the unmanned vehicle 2 from the parking site, and the case of refueling the unmanned vehicle 2, a driver may board the unmanned vehicle 2 to manipulate the unmanned vehicle 2.

The unmanned vehicle 2 is used for the work in the mine. In the embodiment, it is configured that the unmanned vehicle 2 is a dump truck 2 as a kind of a transport vehicle. The dump truck 2 can run in the mine and transport a load in the mine. The dump truck 2 is configured to include a vehicle 3 and a vessel 4 installed on the vehicle 3. The dump truck 2 transports the load loaded on the vessel 4. The load includes soil or rocks which are generated in the mining of crushed stones.

In a mining site of the mine, a loading site LPA, a dumping site DPA, and a haul road HL communicating with at least one of the loading site LPA and the dumping site DPA are arranged. In many cases, the haul road HL is an unpaved road. The dump truck 2 can run in the loading site LPA, the dumping site DPA, and the haul road HL. In the loading site LPA, a load is loaded on the vessel 4. The load is loaded on the vessel 4 by a loading machine LM. As the loading machine LM, an excavator or a wheel loader is used. The dump truck 2 loaded with the load runs on the haul road HL from the loading site LPA to the dumping site DPA. In the dumping site DPA, the load is discharged from the vessel 4. The dump truck 2 from which the load is discharged runs on the haul road HL from the dumping site DPA to the loading site LPA. In addition, the dump truck 2 may run from the dumping site DPA to a predetermined parking site.

The manned vehicle 40 can run in the mine. The manned vehicle 40 is a moving body different from the dump truck 2. The manned vehicle 40 can run in the loading site LPA, the dumping site DPA, and the haul road HL. The worker boards the manned vehicle 40 to move in the mine. The worker performs monitoring, maintenance, or the like of the mine.

A position of the dump truck 2 and a position of the manned vehicle 40 are detected by a global positioning system (GPS). The GPS includes a GPS satellite ST. The position detected by the GPS is an absolute position defined in a GPS coordinate system. In the description hereinafter, the position detected by the GPS is appropriately referred to as a GPS position. The GPS position includes coordinate data of latitude, longitude, and altitude.

<Manned Vehicle>

Figure 2:
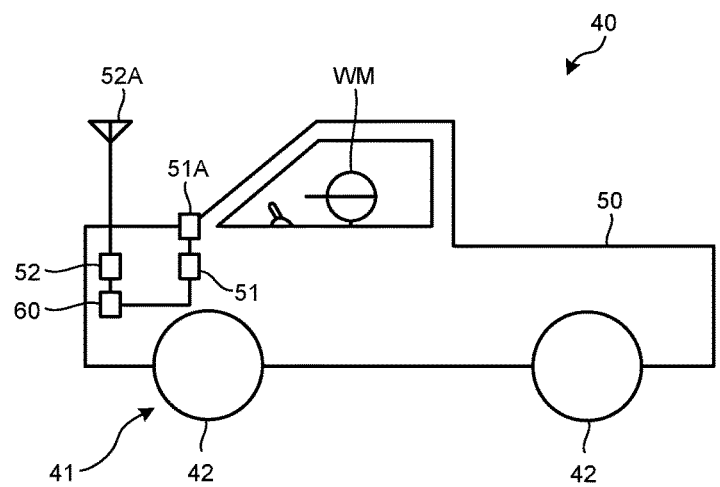
FIG. 2 is a schematic diagram illustrating an example of a manned vehicle according to the embodiment.
Figure 3:
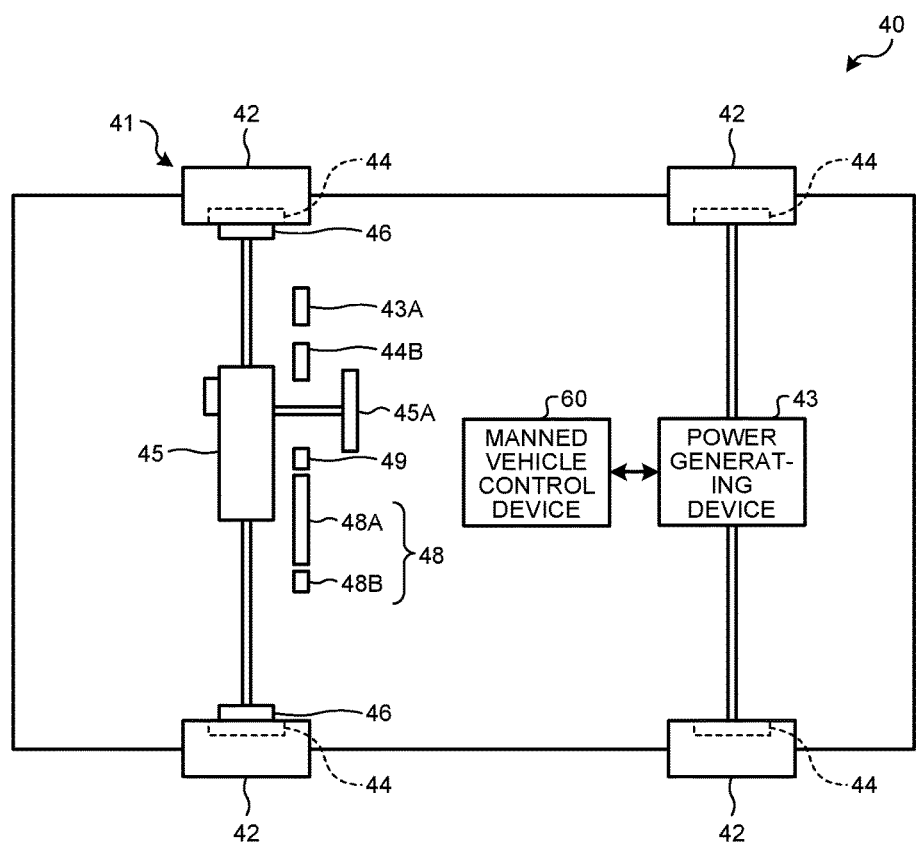
FIG. 3 is a schematic diagram illustrating an example of a manned vehicle according to the embodiment.
Figure 4:
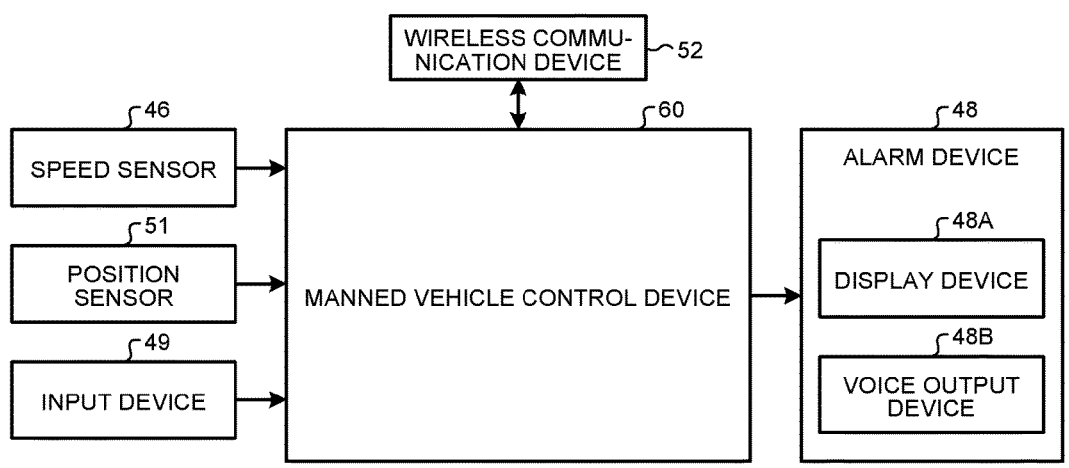
FIG. 4 is a functional block diagram illustrating an example of a manned vehicle according to the embodiment.

Next, the manned vehicle 40 will be described. FIGS. 2 and 3 are schematic diagrams illustrating examples of the manned vehicle 40 according to the embodiment. FIG. 4 is a functional block diagram illustrating an example of the manned vehicle 40 according to the embodiment.

The manned vehicle 40 is configured to include a driving device 41 which can run in the mine, a vehicle body 50 which is supported on the driving device 41, a power generating device 43 which generates power, and a manned vehicle control device 60.

The driving device 41 is configured to include wheels 42, axles which rotatably support the wheels 42, a brake device 44 which can stop running, and a steering device 45 which can steer a running direction.

The driving device 41 drives by the power generated by the power generating device 43. The power generating device 43 includes an internal combustion engine such as a diesel engine. The power generated by the power generating device 43 is transmitted to the wheels 42 of the driving device 41. By the power, the driving device 41 is driven. By adjusting the power of the power generating device 43, the running speed of the manned vehicle 40 is adjusted.

The brake device 44 can stop the running of the driving device 41. The brake device 44 is operated, so that the running speed of the manned vehicle 40 is adjusted.

The steering device 45 can steer the running direction of the driving device 41. The running direction of the manned vehicle 40 including the driving device 41 includes the direction of the front portion of the vehicle body 50. The steering device 45 steers the running direction of the manned vehicle 40 by changing the direction of the front wheels.

The manned vehicle 40 includes a cockpit which the worker WM boards. The manned vehicle 40 includes an accelerator manipulation unit 43A which is installed in the cockpit to manipulate the power generating device 43, a brake manipulation unit 44A which is installed in the cockpit to manipulate the brake device 44, and a steering manipulation unit 45A which is installed in the cockpit to manipulate the steering device 45. The accelerator manipulation unit 43A includes an accelerator pedal. The brake manipulation unit 44A includes a brake pedal. The steering manipulation unit 45A includes a steering handle. The accelerator manipulation unit 43A, the brake manipulation unit 44A, and the steering manipulation unit 45A are manipulated by the worker WM. The worker WM manipulates one or both of the accelerator manipulation unit 43A and the brake manipulation unit 44A to adjust the running speed of the manned vehicle 40. The worker WM manipulates the steering manipulation unit 45A to steer the running direction of the manned vehicle 40.

In addition, the manned vehicle 40 includes an alarm device 48 which is installed in the cockpit and an input device 49 which is installed in the cockpit.

The alarm device 48 includes at least one of the display device 48A and the voice output device 48B. The display device 48A includes a flat panel display such as a liquid crystal display. The display device 48A can display alarm data. The voice output device 48B can generate at least one of alarm sound and alarm light.

The input device 49 includes input devices such as a keyboard, a touch panel, and a mouse. When the input device 49 is manipulated by the worker WM of the manned vehicle 40, the input device 49 generates a command signal. The command signal generated by the input device 49 is input to the manned vehicle control device 60. In addition, the input device 49 may include a voice recognition device, and a command signal may be generated by voice of the worker WM. In addition, in the case where the input device 49 includes a touch panel, the display device 48A may also be used as the input device 49.

In addition, the manned vehicle 40 is configured to include a speed sensor 46 which detects the running speed of the manned vehicle 40, a position sensor 51 which detects the position of the manned vehicle 40, and a wireless communication device 52.

The speed sensor 46 is installed in the manned vehicle 40. The speed sensor 46 detects the running speed of the driving device 41 of the manned vehicle 40. The speed sensor 46 includes a rotation speed sensor which detects the rotation speed of the wheels 42. The rotation speed of the wheels 42 correlates with the running speed of the manned vehicle 40. The rotation speed value which is a detection value of the rotation speed sensor is converted into the running speed value of the manned vehicle 40. A movement distance of the manned vehicle 40 is derived by integrating the running speed of the manned vehicle 40.

The position sensor 51 is installed in the manned vehicle 40. The position sensor 51 includes a GPS receiver to detect a GPS position of the manned vehicle 40. The position sensor 51 includes a GPS antenna 51A. The antenna 51A receives a radio wave from the GPS satellite ST. The position sensor 51 converts a signal based on the radio wave from the GPS satellite ST received through the antenna 51A into an electrical signal to calculate the position of the antenna 51A. By calculating the GPS position of the antenna 51A, the GPS position of the manned vehicle 40 is detected.

The communication system 9 includes the wireless communication device 52 installed in the manned vehicle 40. The wireless communication device 52 includes an antenna 52A. The wireless communication device 52 can communicate with the management device 10 and the dump truck 2 in a wireless manner.

The manned vehicle control device 60 is installed in the manned vehicle 40. The manned vehicle control device 60 controls the manned vehicle 40. The manned vehicle control device 60 includes a computer system. The manned vehicle control device 60 includes a processor such as a central processing unit (CPU) and memories such as a random access memory (RAM) and a read only memory (ROM).

A detection signal of the speed sensor 46 is output to the manned vehicle control device 60. A detection signal of the position sensor 51 is output to the manned vehicle control device 60. The command signal generated by the input device 49 is output to the manned vehicle control device 60. The detection signal of the speed sensor 46, the detection signal of the position sensor 51, and the command signal generated by the input device 49 are supplied through the communication system 9 to the management device 10. In addition, the command signal from the management device 10 is supplied through the communication system 9 to the manned vehicle control device 60.

<Management Device>

Figure 5:
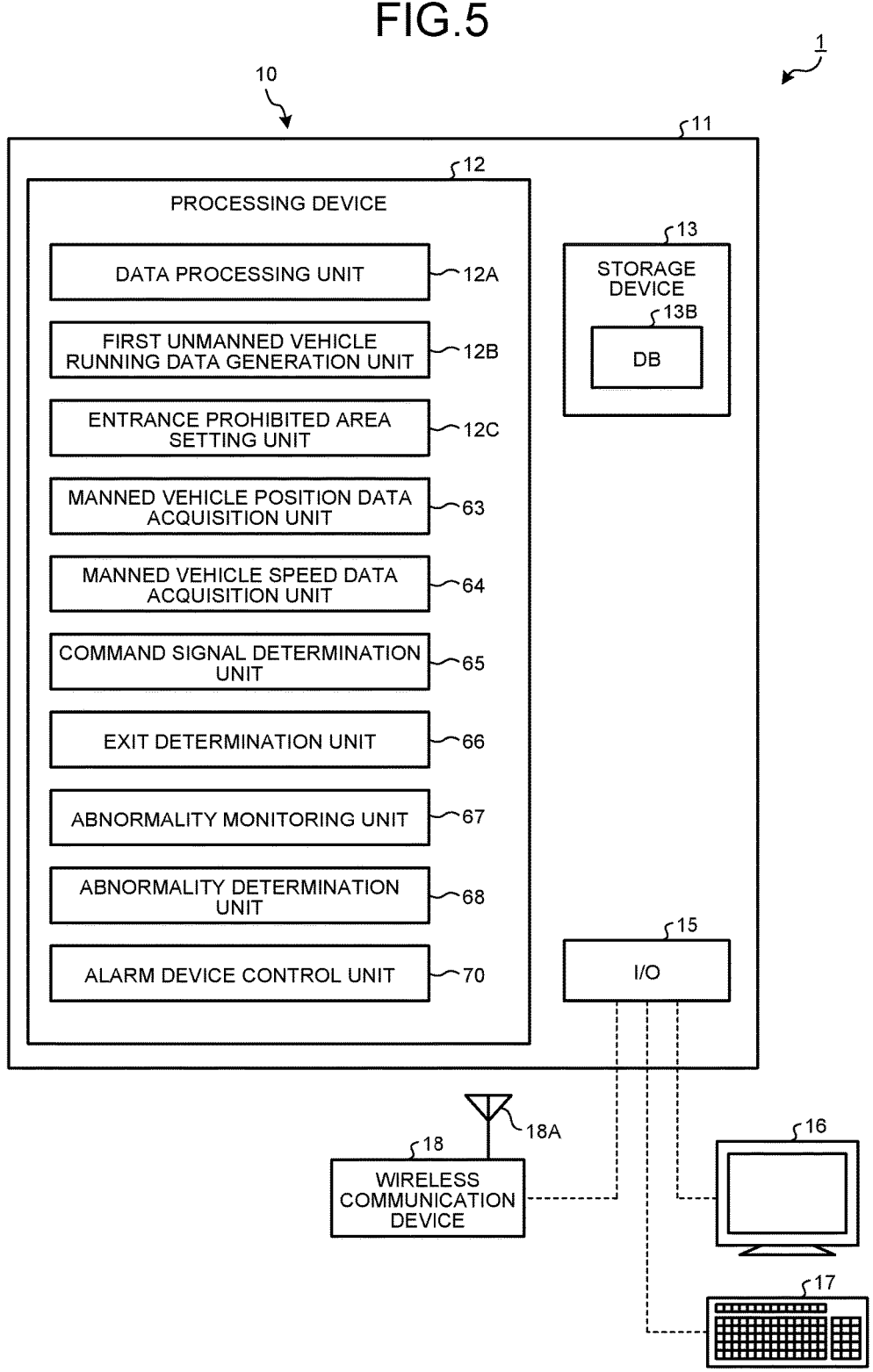
FIG. 5 is a functional block diagram illustrating an example of a management device according to the embodiment.

Next, the management device 10 of the management system 1 will be described. FIG. 5 is a block diagram illustrating an example of the management device 10 according to the embodiment. As illustrated in FIG. 5, the management device 10 is configured to include a computer system 11, a display device 16, an input device 17, and a wireless communication device 18.

The computer system 11 is configured to include a processing device 12, a storage device 13, and an input/output unit 15. The display device 16, the input device 17, and the wireless communication device 18 are connected to the computer system 11 through the input/output unit 15.

The communication system 9 includes the wireless communication device 18 installed in the control facility 8. The wireless communication device 18 is connected to the processing device 12 through the input/output unit 15. The wireless communication device 18 includes an antenna 18A. The wireless communication device 18 can communicate with the dump truck 2 and the manned vehicle 40.

The processing device 12 includes a processor such as a central processing unit (CPU). The processing device 12 is configured to include a data processing unit 12A, a first unmanned vehicle running data generation unit 12B, an entrance prohibited area setting unit 12C, a manned vehicle position data acquisition unit 63, a manned vehicle speed data acquisition unit 64, a command signal determination unit 65, an exit determination unit 66, an abnormality monitoring unit 67, an abnormality determination unit 68, and an alarm device control unit 70.

The data processing unit 12A processes, for example, the position data of the dump truck 2. The position data of the dump truck 2 are supplied through the communication system 9 from the dump truck 2.

The first unmanned vehicle running data generation unit 12B generates first unmanned vehicle running data including a target running path of the dump truck 2 in the mine. The dump truck 2 runs in the loading site LPA, the dumping site DPA, and the haul road HL based on the first unmanned vehicle running data generated by the first unmanned vehicle running data generation unit 12B.

The entrance prohibited area setting unit 12C sets an entrance prohibited area where entrance of the dump truck 2 is prohibited in the mine. The entrance prohibited area setting unit 12C sets the entrance prohibited area so that the entrance prohibited area includes the position of the manned vehicle 40.

The manned vehicle position data acquisition unit 63 acquires manned vehicle position data representing the position (GPS position) of the manned vehicle 40. The manned vehicle position data are acquired by the position sensor 51 installed in the manned vehicle 40. The manned vehicle position data acquisition unit 63 acquires the manned vehicle position data through the communication system 9 from the manned vehicle 40. The manned vehicle position data acquisition unit 63 functions as a moving body position data acquisition unit which acquires the position data of the manned vehicle 40 as a moving body which is different from the dump truck 2. The moving body position data representing the position of the moving body include the manned vehicle position data.

The manned vehicle speed data acquisition unit 64 acquires manned vehicle speed data representing the running speed of the driving device 41 of the manned vehicle 40. The manned vehicle speed data are acquired by the speed sensor 46 installed in the manned vehicle 40. The manned vehicle speed data acquires the manned vehicle speed data through the communication system 9 from the manned vehicle 40. The manned vehicle speed data acquisition unit 64 functions as a moving body speed data acquisition unit which acquires the speed data of the manned vehicle 40 as a moving body which is different from the dump truck 2. The moving body speed data representing the running speed of the moving body include the manned vehicle speed data.

The command signal determination unit 65 determines based on the manipulation of the input device 49 installed in the manned vehicle 40 whether or not the command signal is generated. If the worker WM performs input manipulation on the input device 49, the input device 49 generates the command signal. The command signal generated by the input device 49 is transmitted through the communication system 9 to the management device 10. In the case where the command signal determination unit 65 acquires the command signal of the input device 49 through the communication system 9 from the manned vehicle 40, the command signal determination unit determines that the input device 49 is manipulated. In the case where the command signal determination unit 65 does not acquire the command signal of the input device 49 through the communication system 9 from the manned vehicle 40, the command signal determination unit determines that the input device 49 is not manipulated.

The exit determination unit 66 determines based on manned vehicle position data whether or not the manned vehicle 40 exits an operation area where the dump truck 2 operates in the mine. Operation area data representing the operation area of the dump truck 2 are known data which are set in advance and are stored in the storage device 13. The exit determination unit 66 determines based on the manned vehicle position data acquired by the manned vehicle position data acquisition unit 63 and the operation area data stored in the storage device 13 whether or not the manned vehicle 40 exits the operation area of the dump truck 2.

The abnormality monitoring unit 67 ends abnormality monitoring for the manned vehicle 40 based on the manipulation on the input device 49 installed in the manned vehicle 40. The abnormality monitoring for the manned vehicle 40 includes at least one of monitoring the state of communication between the management device 10 and the manned vehicle 40 by the communication system 9 and monitoring the accuracy of the position of the manned vehicle 40. The communication state monitoring includes monitoring whether the state of communication between the management device 10 and the manned vehicle 40 by the communication system 9 is normal or abnormal. The position accuracy monitoring includes monitoring whether the position detection state of the manned vehicle 40 by the position sensor 51 including the GPS receiver is normal or abnormal. When the input device 49 is manipulated and the command signal determination unit 65 acquires the command signal of the input device 49, an abnormality monitoring unit 57 cancels the abnormality monitoring function including at least one of the communication state monitoring function and the position accuracy monitoring function. In addition, the abnormality monitoring function includes activating and enabling a later-described function of expanding the entrance prohibited area in the abnormal period, and the canceling the abnormality monitoring function includes canceling the function of expanding the entrance prohibited area.

In addition, in the embodiment, even in the case where the input device 49 is not manipulated, when it is determined that manned vehicle 40 exits the operation area of the dump truck 2, the abnormality monitoring unit 67 cancels the abnormality monitoring function and ends the abnormality monitoring. When it is determined that the manned vehicle 40 exits the operation area of the dump truck 2, the abnormality monitoring unit 67 cancels the function of expanding the entrance prohibited area.

The abnormality determination unit 68 determines by the abnormality monitoring function for the manned vehicle 40 whether or not the abnormality occurs. The abnormality determination unit 68 performs at least one of communication state determination of determining whether or not the communication state of the communication system 9 is normal and position accuracy determination of determining whether or not the position detection accuracy of the position sensor 51 is normal.

In the embodiment, in the case where the abnormality determination unit 68 determines by the abnormality monitoring function that the abnormality occurs, the entrance prohibited area setting unit 12C activates and enables a function of expanding the entrance prohibited area.

In the abnormal period of the abnormality monitoring function, the entrance prohibited area setting unit 12C reckons a probable existence area of the manned vehicle 40. The entrance prohibited area setting unit 12C reckons a probable existence area where the manned vehicle 40 is likely to exist at a second time point later than a first time point based on manned vehicle status data at the first time point when the accuracy of the position of the manned vehicle 40 detected by the position sensor 51 is normal. The manned vehicle status data at the first time point include the manned vehicle position data representing the GPS position of the manned vehicle 40 at the first time point and the manned vehicle speed data representing the running speed of the manned vehicle 40 at the first time point. In addition, the manned vehicle status data at the first time point may include steering data representing a steering angle of the driving device 41 at the first time point. Although the accuracy of the position of the manned vehicle 40 detected by the position sensor 51 at the second time point is abnormal, the entrance prohibited area setting unit 12C can reckon the probable existence area of the manned vehicle 40 at the second time point based on the manned vehicle status data at the first time point. The entrance prohibited area setting unit 12C expands the entrance prohibited area based on the reckoned probable existence area of the manned vehicle 40. The entrance prohibited area setting unit 12C expands the entrance prohibited area by the amount corresponding to the probable existence area. In the embodiment, the probable existence area of the manned vehicle 40 is expanded as time elapses.

The alarm device control unit 70 outputs a control signal of controlling the alarm device 48 installed in the manned vehicle 40. The alarm device control unit 70 outputs the control signal through the communication system 9 to the manned vehicle 40. When the exit determination unit 66 determines that the manned vehicle 40 exits the operation area of the dump truck 2 and the command signal determination unit 65 determines that the input device 49 is not manipulated, the alarm device control unit 70 outputs a control signal of activating the alarm device 48 installed in the manned vehicle 40.

The storage device 13 stores various data of the dump truck 2 and the manned vehicle 40. The storage device 13 is connected to the processing device 12. The storage device 13 includes memories such as a random access memory (RAM) or a read only memory (ROM) and storages such as a hard disk drive. The storage device 13 includes database 13B where data are registered. The first unmanned vehicle running data generation unit 12B generates first unmanned vehicle running data by using a computer program stored in the storage device 13.

The storage device 13 stores the operation area data representing operation areas where the dump truck 2 operates. In addition, the storage device 13 stores the safety area data representing safety areas where the dump truck 2 does not operate. In addition, there may be no safety area data.

The display device 16 includes a flat panel display such as a liquid crystal display. The input device 17 includes input devices such as a keyboard, a touch panel, and a mouse. When the input device 17 is manipulated by a manager of the control facility 8, the input device 17 generates a command signal. The command signal generated by the input device 17 is input to the processing device 12.

<Dump Truck>

Figure 6:
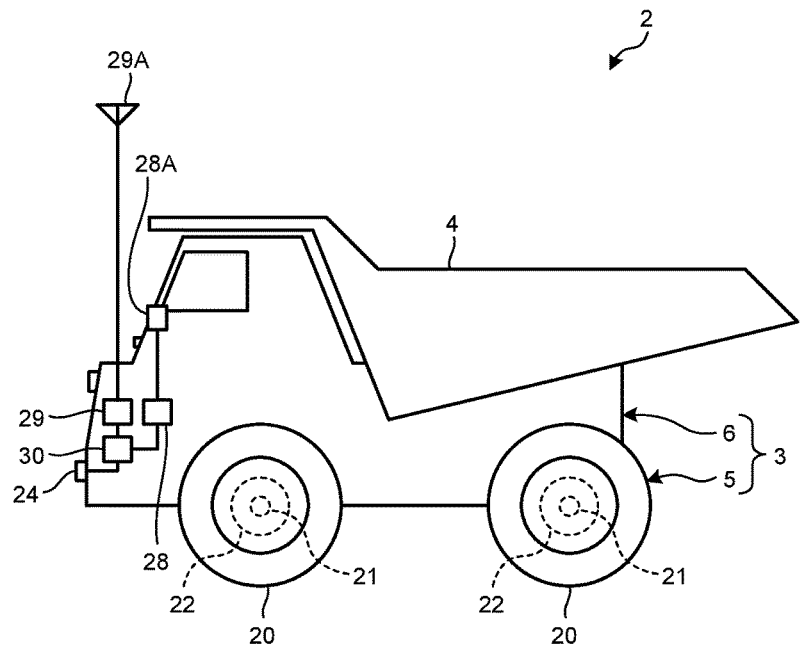
FIG. 6 is a schematic diagram illustrating an example of an unmanned vehicle according to the embodiment.
Figure 7:
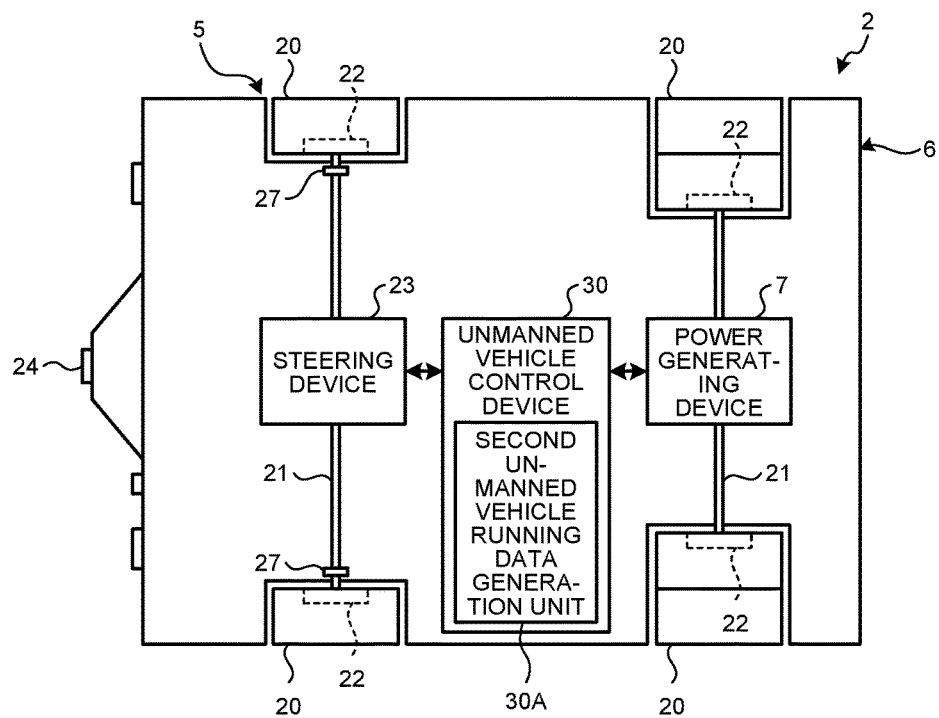
FIG. 7 is a schematic diagram illustrating an example of an unmanned vehicle according to the embodiment.
Figure 8:
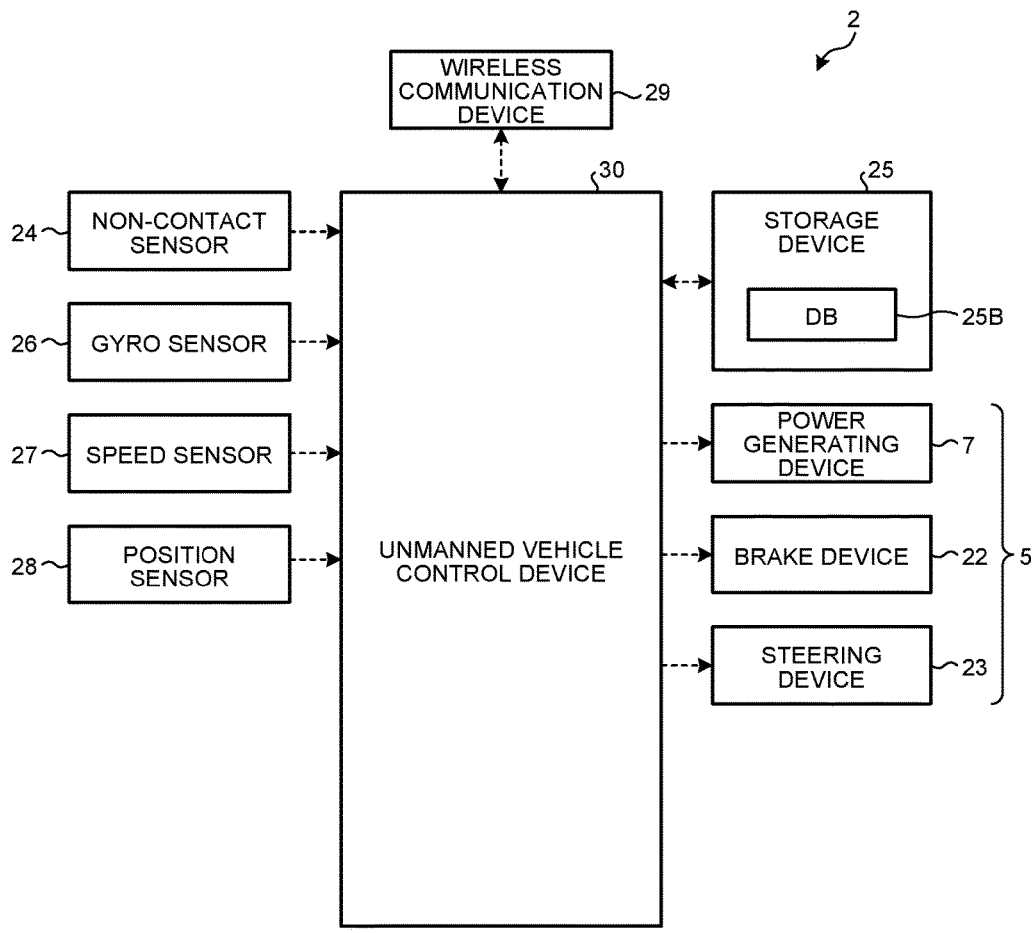
FIG. 8 is a functional block diagram illustrating an example of an unmanned vehicle according to the embodiment.

Next, the dump truck 2 will be described. FIGS. 6 and 7 are schematic diagrams illustrating examples of the dump truck 2 according to the embodiment. FIG. 8 is a functional block diagram illustrating an example of the dump truck 2 according to the embodiment.

The dump truck 2 is configured to include a vehicle 3, a vessel 4 installed in the vehicle 3, a non-contact sensor 24 which detects an object in a non-contact manner, a storage device 25 which includes database 25B, a gyro sensor 26 which detects an angular speed of the dump truck 2, a speed sensor 27 which detects a running speed of the dump truck 2, a position sensor 28 which detects a position of the dump truck 2, a wireless communication device 29, and an unmanned vehicle control device 30.

The vehicle 3 is configured to include a driving device 5 which can run in the mine, a vehicle body 6 which is supported on the driving device 5, and a power generating device 7 which generates power. The vessel 4 is supported on the vehicle body 6.

The driving device 5 is configured to include wheels 20, axles 21 which rotatably support the wheels 20, a brake device 22 which can stop running, and a steering device 23 which can steer a running direction.

The driving device 5 drives by the power generated by the power generating device 7. The power generating device 7 drives the driving device 5 in an electrical driving manner. The power generating device 7 is configured to include an internal combustion engine such as a diesel engine, a generator which is activated by the power of the internal combustion engine, and a motor which is activated by electric power generated by the generator. Power generated by the motor is transmitted to the wheels 20 of the driving device 5. By the power, the driving device 5 is driven. By the power of the power generating device 7 installed in the vehicle 3, the dump truck 2 self-runs. By adjusting the power of the power generating device 7, the running speed of the dump truck 2 is adjusted. In addition, the power generating device 7 may drive the driving device 5 in a mechanical driving manner. For example, the power generated by the internal combustion engine may be transmission through a power transmission device to the wheels 20 of the driving device 5.

The steering device 23 can steer the running direction of the driving device 5. The running direction of the dump truck 2 including the driving device 5 includes the direction of a front portion 6F of the vehicle body 6. The steering device 23 steers the running direction of the dump truck 2 by changing the direction of the wheels 20.

The non-contact sensor 24 is installed in the front portion of the vehicle body 6. The non-contact sensor 24 detects an object around the vehicle body 6 in a non-contact manner. The non-contact sensor 24 includes a laser scanner. The non-contact sensor 24 detects the object in a non-contact manner by using laser light as detection light. The non-contact sensor 24 can detect existence of an object, a relative position to the object, and a relative speed to the object. The relative position to the object includes a relative distance to the object and an orientation where the object exists with respect to the non-contact sensor 24. In addition, the non-contact sensor 24 may include a radar device such as a millimeter-wave radar device. The radar device can detect the object in a non-contact manner by using a radio wave.

The gyro sensor 26 detects an angular speed of the dump truck 2. An orientation of the dump truck 2 is derived by integrating the angular speed of the dump truck 2.

The speed sensor 27 detects the running speed of the dump truck 2. The speed sensor 27 includes a rotation speed sensor which detects the rotation speed of the wheels 20. The rotation speed of the wheels 20 correlates with the running speed of the dump truck 2. The rotation speed value which is a detection value of the rotation speed sensor is converted into the running speed value of the dump truck 2. In addition, the speed sensor 27 may detect a rotation speed of the axle 21.

The position sensor 28 is installed in the vehicle 3. The position sensor 28 includes a GPS receiver to detect a GPS position of the dump truck 2. The position sensor 28 includes a GPS antenna 28A. The antenna 28A receives a radio wave from the GPS satellite ST. The position sensor 28 converts a signal based on the radio wave from the GPS satellite ST received through the antenna 28A into an electrical signal to calculate the position of the antenna 28A. By calculating the GPS position of the antenna 28A, the GPS position of the dump truck 2 is detected.

The communication system 9 includes the wireless communication device 29 installed in the vehicle 3. The wireless communication device 29 includes an antenna 29A. The wireless communication device 29 can communicate with the management device 10 and the manned vehicle 40 in a wireless manner.

The unmanned vehicle control device 30 is installed in the dump truck 2. The unmanned vehicle control device 30 controls the dump truck 2. The unmanned vehicle control device 30 includes a computer system. The unmanned vehicle control device 30 includes a processor such as a central processing unit (CPU) and memories such as a random access memory (RAM) and a read only memory (ROM).

The management device 10 supplies a command signal including the first unmanned vehicle running data of the dump truck 2 to the unmanned vehicle control device 30 through the communication system 9. The unmanned vehicle control device 30 controls the driving device 5 of the dump truck 2 based on the first unmanned vehicle running data supplied from the first unmanned vehicle running data generation unit 12B of the management device 10. The control of the driving device 5 includes control of at least one of steering, accelerator, and brake of the driving device 5.

The first unmanned vehicle running data generated by the first unmanned vehicle running data generation unit 12B of the management device 10 represent target running paths of the dump truck 2 and limited running speeds of the dump truck 2. The management device 10 determines the limited running speed (maximum allowed speed) of the dump truck 2 for each of the positions (areas) of the haul road HL based on an environment condition of the mine including geographical conditions and climate conditions of the mine. The management device 10 transmits the first unmanned vehicle running data representing the target running paths and the limited running speeds of the dump truck 2 to the dump truck 2.

The unmanned vehicle control device 30 includes a second unmanned vehicle running data generation unit 30A which generates second unmanned vehicle running data. The second unmanned vehicle running data generation unit 30A of the unmanned vehicle control device 30 generates the second unmanned vehicle running data including the target running speed data of the dump truck 2 based on the first unmanned vehicle running data supplied from the management device 10. The unmanned vehicle control device 30 controls the driving device 5 based on the first unmanned vehicle running data supplied from the management device 10 and the second unmanned vehicle running data generated by the second unmanned vehicle running data generation unit 30A. The unmanned vehicle control device 30 determines the running speed of the driving device 5 within the range of the limited running speed determined by the management device 10 to control the driving device 5. In other words, the dump truck 2 sets the limited running speed determined by the management device 10 as an upper limit to determine the running speed by the second unmanned vehicle running data generation unit 30A and can freely perform acceleration and deceleration.

In the embodiment, the dump truck 2 runs based on dead reckoning navigation. The dump truck 2 runs in the loading site LPA, the dumping site DPA, and the haul road HL based on the first unmanned vehicle running data generated by the first unmanned vehicle running data generation unit 12B and the second unmanned vehicle running data generated by the second unmanned vehicle running data generation unit 30A. The unmanned vehicle control device 30 allows the dump truck 2 to run based on the target running path supplied from the first unmanned vehicle running data generation unit 12B and the target running speed data generated by the second unmanned vehicle running data generation unit 30A while reckoning the current position of the dump truck 2 by using the dead reckoning navigation. The dead reckoning navigation denotes navigation of reckoning the current position of the dump truck 2 based on an orientation and a moving distance from a start point of which the longitude and the latitude are known. The orientation of the dump truck 2 is detected by using the gyro sensor 26 installed in the dump truck 2. The moving distance of the dump truck 2 is detected by using the speed sensor 27 installed in the dump truck 2. The detection signal of the gyro sensor 26 and the detection signal of the speed sensor 27 are output to the unmanned vehicle control device 30 of the dump truck 2. The unmanned vehicle control device 30 can obtain the orientation of the dump truck 2 from the known start point based on the detection signal from the gyro sensor 26. The unmanned vehicle control device 30 can obtain the moving distance of the dump truck 2 from the known start point based on the detection signal from the speed sensor 27. The unmanned vehicle control device 30 controls the running of the driving device 5 of the dump truck 2 based on the detection signal from the gyro sensor 26 and the detection signal from the speed sensor 27 so that the dump truck 2 runs according to the target running path of the first unmanned vehicle running data and the target running speed data of the second unmanned vehicle data.

In the embodiment, the reckoned position of the dump truck 2 obtained by the dead reckoning navigation is corrected by using the GPS. If the moving distance of the dump truck 2 is long, due to accumulation of detection error of one or both of the gyro sensor 26 and the speed sensor 27, there is a possibility that an error may occur between the reckoned position which is a reckoned current position of the dump truck 2 and an actual position. As a result, there is a possibility that the dump truck 2 deviates from the target running path of the first unmanned vehicle running data to run. In the embodiment, the unmanned vehicle control device 30 allows the dump truck 2 to run while correcting the reckoned position of the dump truck 2 which is reckoned by the dead reckoning navigation by using the GPS position data representing the GPS position of the dump truck 2 detected by the position sensor 28. The unmanned vehicle control device 30 calculates a correction amount correcting the position of the dump truck 2 based on the detection signal from the gyro sensor 26, the detection signal from the speed sensor 27, and the GPS position data so that the dump truck 2 runs along the target running path and controls the running of the driving device 5 of the dump truck 2 based on the calculated correction amount.

In addition, in the embodiment, although the reckoned position obtained by the dead reckoning navigation is corrected by using the GPS, the correction may be performed by other methods. For example, landmarks of which the installation positions are registered may be detected by the non-contact sensor 24 installed in the dump truck 2, the reckoned position may be corrected based on a result of the detection of the non-contact sensor 24. In addition, the landmarks are a plurality of structures arranged along the haul road HL. The installation positions (absolute positions) of the landmarks are measured and registered in advance. In addition, a roadside map of the haul road HL may be measured in advance, and the reckoned position may be corrected based on a result of checking of the roadside map and a shape of the haul road HL detected by the non-contact sensor 24.

<Entrance Prohibited Area>

Figure 9:
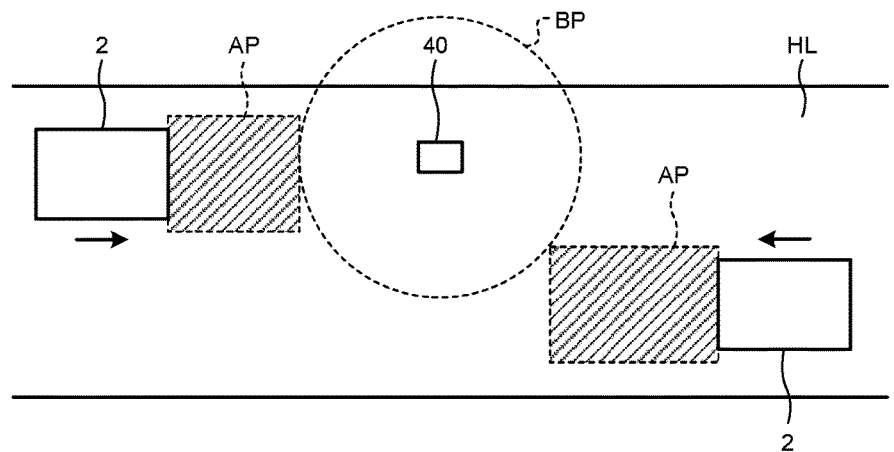
FIG. 9 is a schematic diagram illustrating an example of an entrance prohibited area according to the embodiment.

Next, the entrance prohibited area BP set by the entrance prohibited area setting unit 12C will be described. FIG. 9 is a schematic diagram illustrating an example of the entrance prohibited area BP according to the embodiment. As illustrated in FIG. 9, in the embodiment, the entrance prohibited area BP is set as a circle.

The manned vehicle position data representing the position of the manned vehicle 40 are transmitted from the manned vehicle 40 through the communication system 9 to the management device 10. The entrance prohibited area setting unit 12C of the management device 10 sets the entrance prohibited area BP where entrance of the dump truck 2 is prohibited so that the entrance prohibited area includes the position of the manned vehicle 40.

As illustrated in FIG. 9, in the case where the manned vehicle 40 exists in the haul road HL, the entrance prohibited area setting unit 12C sets the entrance prohibited area BP so that the manned vehicle 40 is protected. In addition, the first unmanned vehicle running data generation unit 12B sets a running allowed area AP of the dump truck 2 so that the running allowed area does not overlap the entrance prohibited area BP. In the example illustrated in FIG. 9, two dump trucks 2 which run on the outgoing path and the incoming path stop on the haul road HL so as not to enter the entrance prohibited area BP. Therefore, collision between the dump truck 2 and the manned vehicle 40 is avoided.

In addition, the entrance prohibited area BP may not be a circle, but, for example, a rectangle.

<Managing Method>

Figure 10:
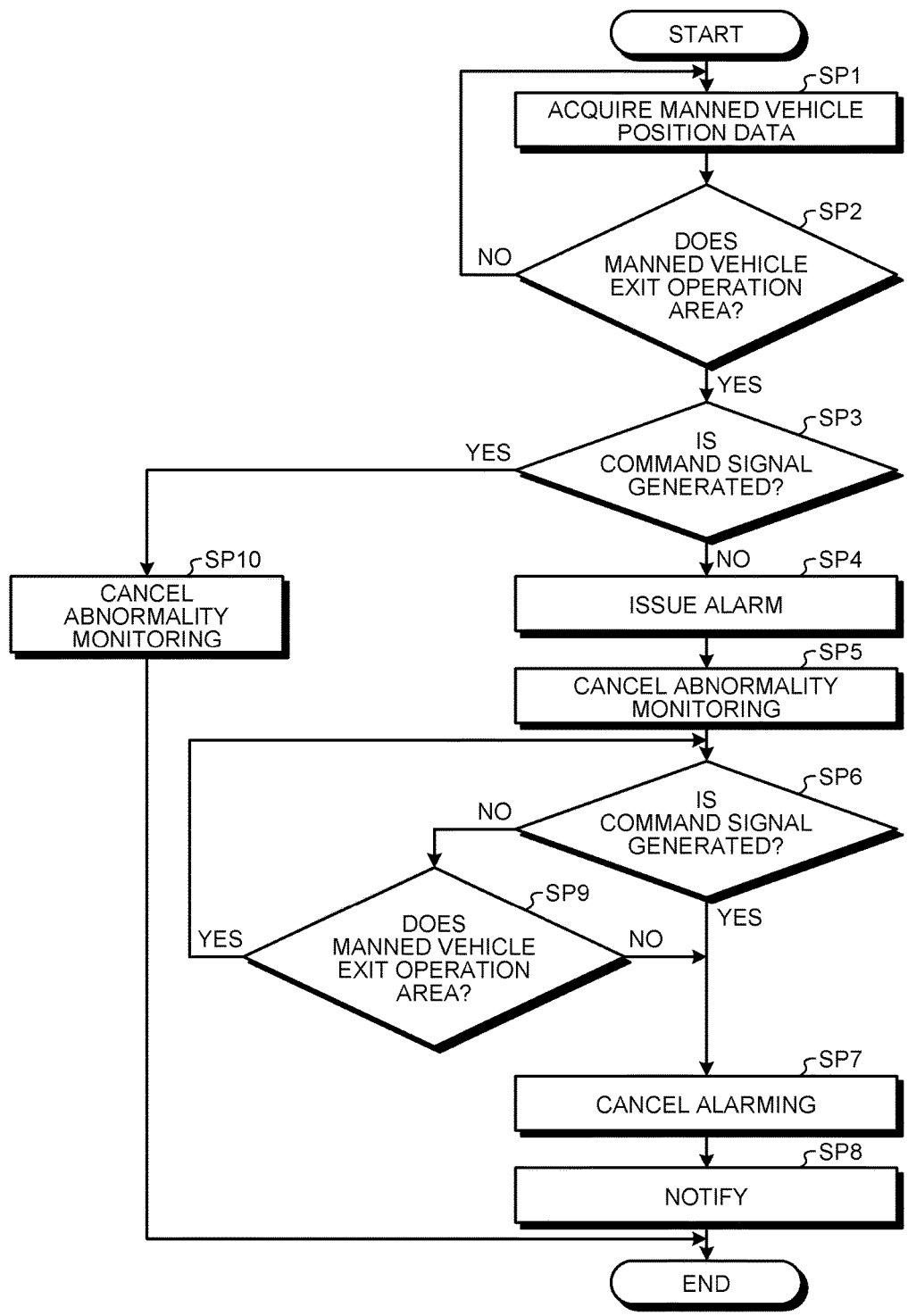
FIG. 10 is a flowchart illustrating an example of a mine managing method according to an embodiment.
Figure 11:
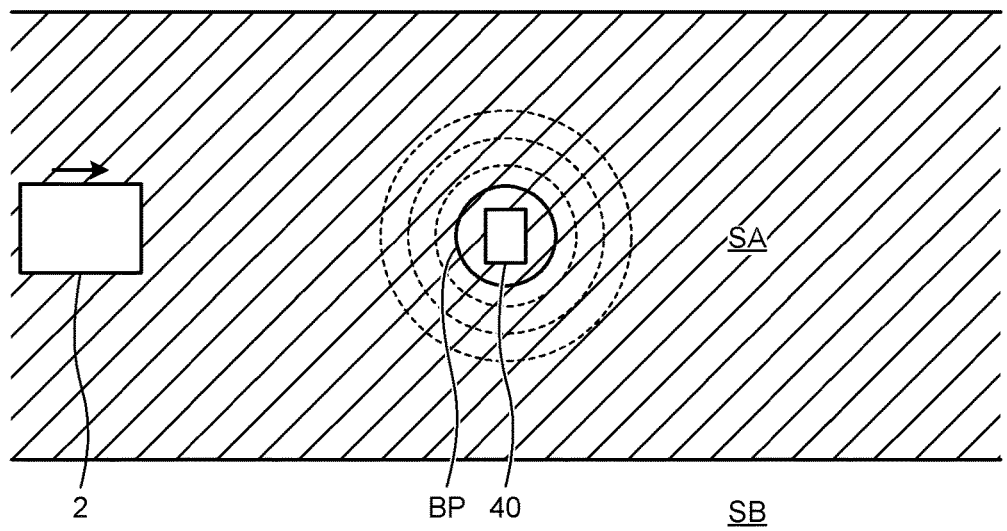
FIG. 11 is a schematic diagram illustrating an example of a mine managing method according to the embodiment.
Figure 12:
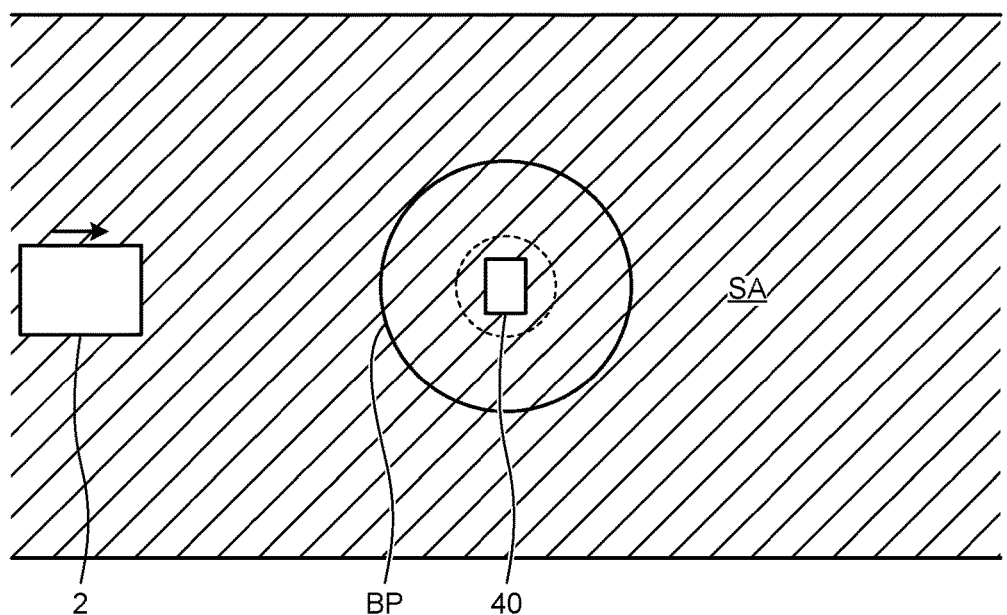
FIG. 12 is a schematic diagram illustrating an example of a mine managing method according to the embodiment.
Figure 13:
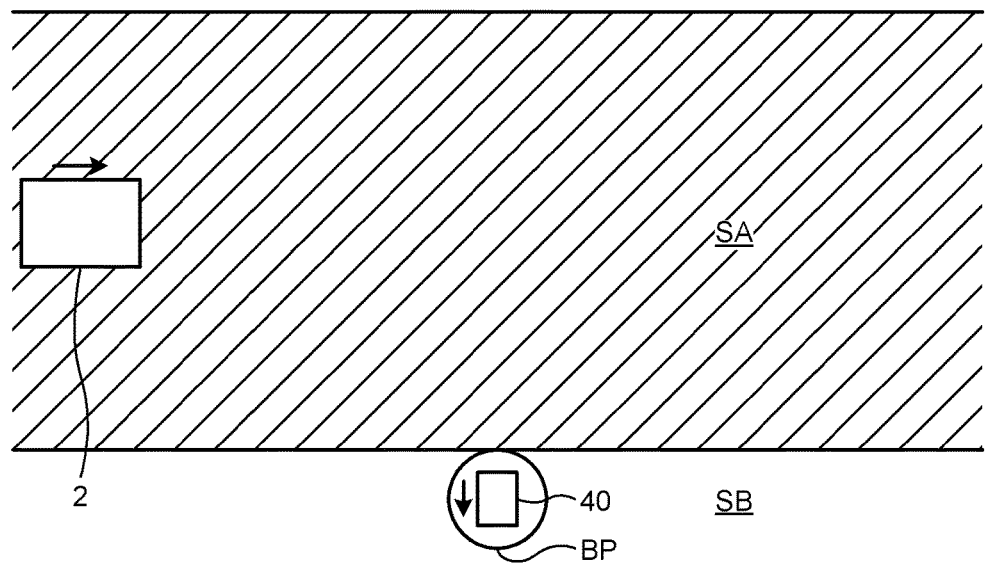
FIG. 13 is a schematic diagram illustrating an example of a mine managing method according to the embodiment.
Figure 14:
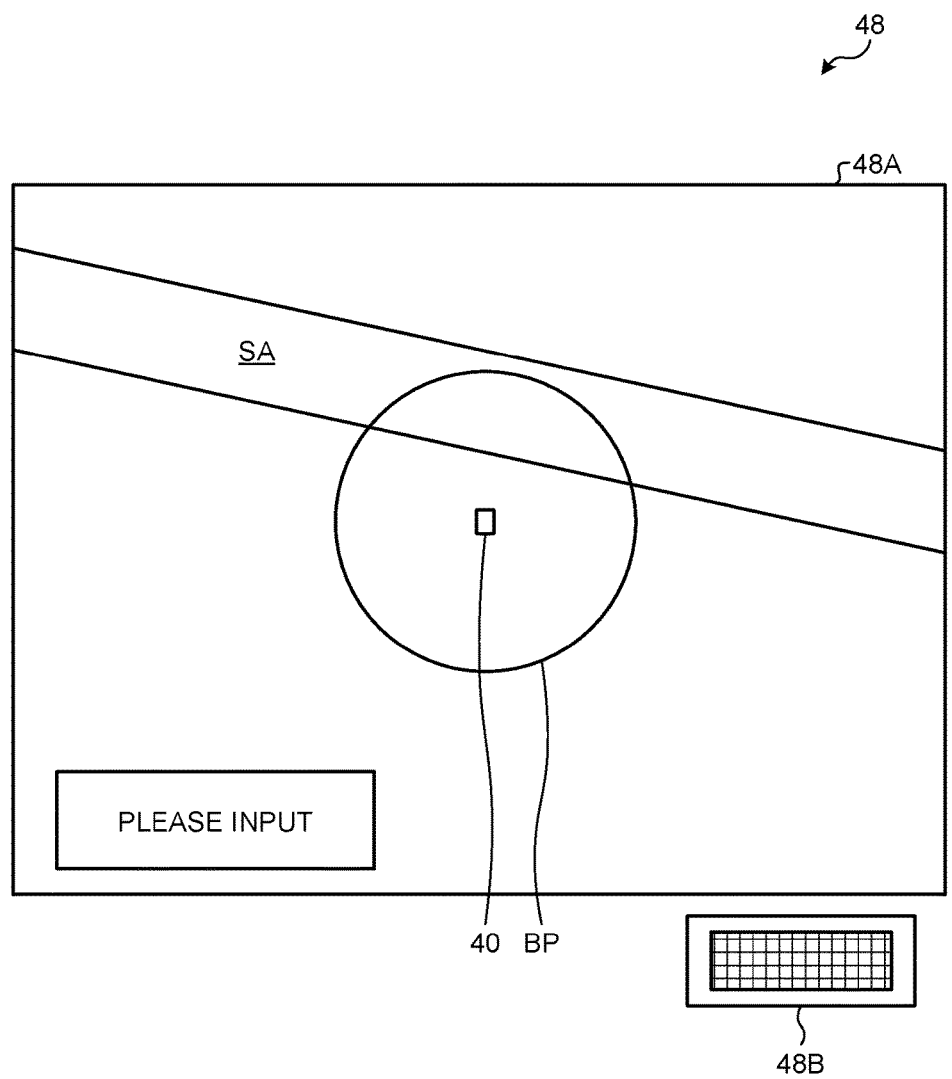
FIG. 14 is a schematic diagram illustrating an example of an alarm device according to the embodiment.

Next, a mine managing method according to the embodiment will be described. FIG. 10 is a flowchart illustrating an example of operations of the mine management system 1 according to the embodiment. FIGS. 11, 12, and 13 are schematic diagrams illustrating examples of the mine managing method according to the embodiment. FIGS. 11 and 12 illustrate states before the manned vehicle 40 exits the operation area SA of the dump truck 2. FIG. 13 illustrates a state after the manned vehicle 40 exits the operation area SA of the dump truck 2. FIG. 14 is a diagram illustrating an example of alarm by the alarm device 48 according to the embodiment.

The operation area SA is an area where the dump truck 2 operates in the mine and includes the haul area where the dump truck 2 runs. In the embodiment, the operation area SA includes at least a portion of the loading site LPA, the dumping site DPA, and the haul road HL, where transporting work of the dump truck 2 is performed.

The safety area SB is an area where the dump truck 2 does not operate in the mine and includes a non-running area where the dump truck 2 does not run. The safety area SB is an outside area of the operation area SA, and in the embodiment, the safety area is outside areas of the loading site LPA, the dumping site DPA, and the haul road HL.

The dump truck 2 runs only in the operation area SA, and the manned vehicle 40 can run in the operation area SA and the safety area SB. In addition, in the case where an access road connected to the haul road HL is installed in the mine, the manned vehicle 40 may enter the operation area SA or exit the operation area SA through the access road. The access road is a running road installed in the safety area SB, and the dump truck 2 does not run on the access road.

The operation area data representing the operation area SA and the safety area data representing the safety area SB are known data set in advance and are stored in the storage device 13. Each of the operation area SA and the safety area SB is an area defined in a GPS coordinate system and includes coordinate data of latitude, longitude, and altitude. In addition, each of the operation area SA and the safety area SB may not be defined in the GPS coordinate system, and a grid coordinate system with an arbitrary point as an origin may be used.

As illustrated in FIGS. 11, 12, and 13, the entrance prohibited area setting unit 12C can set the entrance prohibited area BP in both of the case where the manned vehicle 40 exists in the operation area SA and the case where the manned vehicle exists in the safety area SB.

In the case where the dump truck 2 is allowed to operate in the operation area SA, the unmanned vehicle running data of the dump truck 2 are generated by the first unmanned vehicle running data generation unit 12B of the management device 10. The first unmanned vehicle running data generated by the first unmanned vehicle running data generation unit 12B are transmitted through the communication system 9 to the unmanned vehicle control device 30 of the dump truck 2. The unmanned vehicle control device 30 controls the driving device 5 of the dump truck 2 based on the first unmanned vehicle running data. The dump truck 2 runs in the operation area SA of the mine based on the first unmanned vehicle running data.

If the communication between the manned vehicle 40 and the management device 10 of the management system 1 by the communication system 9 is established, the entrance prohibited area setting unit 12C activates and enables a function of expanding of the entrance prohibited area BP. As illustrated in FIG. 11, in the state where the function of expanding of the entrance prohibited area BP is enabled, when it is determined by the abnormality monitoring function of the abnormality monitoring unit 67 that the abnormality does not occur, the entrance prohibited area setting unit 12C does not expand the entrance prohibited area BP but maintains the size in the normal period. Namely, in the period when the communication between the manned vehicle 40 and the management device 10 is established, when the function of expanding of the entrance prohibited area BP is enabled but the abnormality monitoring unit 67 determines by the abnormality monitoring function that the abnormality does not occur, the entrance prohibited area setting unit 12C does not expand the entrance prohibited area BP.

On the other hand, in the case where the abnormality determination unit 68 determines by the abnormality monitoring function for the manned vehicle 40 that the abnormality occurs, as illustrated in FIG. 12, the entrance prohibited area setting unit 12C expands the size of the entrance prohibited area BP as time elapses in the abnormal period of the abnormality monitoring. Namely, when the abnormality monitoring unit 67 determines by the abnormality monitoring function that the abnormality occurs, the entrance prohibited area setting unit 12C expands the entrance prohibited area BP from the size in the normal period as time elapses.

When it is determined by the abnormality monitoring function of the abnormality monitoring unit 67 that the abnormality occurs, the entrance prohibited area setting unit 12C reckons a probable existence area where the manned vehicle 40 is likely to exist at a second time point later than a first time point based on the manned vehicle status data at the first time point when the abnormality monitoring function is normal. The entrance prohibited area setting unit 12C expands the entrance prohibited area BP based on the reckoned probable existence area.

As described above, the abnormality monitoring function includes at least one of the communication state monitoring function and the position accuracy monitoring function. The abnormality detected by the abnormality monitoring function includes the time of occurrence of the situation where it is difficult to set the entrance prohibited area BP based on the manned vehicle position data such as loss of communication by the communication system 9 and deterioration in accuracy of detection of the position of the manned vehicle 40 by the position sensor 51. By expanding the entrance prohibited area BP, the safety of the manned vehicle 40 is ensured.

As illustrated in FIG. 11, the manned vehicle 40 runs in the operation area SA. The manned vehicle position data acquisition unit 63 of the management device 10 acquires the manned vehicle position data representing the position of the manned vehicle 40 through the communication system 9 from the manned vehicle 40 (step SP1). The entrance prohibited area setting unit 12C sets an entrance prohibited area BP where entrance of the dump truck 2 is prohibited so that the entrance prohibited area includes the position of the manned vehicle 40 based on the manned vehicle position data.

In the state illustrated in FIG. 11, in the state where the abnormality monitoring unit 67 determines by the abnormality monitoring function that the abnormality does not occur, the entrance prohibited area setting unit 12C sets the entrance prohibited area BP to the size in the normal period with respect to the manned vehicle 40 existing in the operation area SA.

The exit determination unit 66 determines based on the manned vehicle position data acquired by the manned vehicle position data acquisition unit 63 and at least one of the operation area data and the safety area data stored in the storage device 13 whether or not the manned vehicle 40 exits the operation area SA (step SP2).

In step SP2, in the case where it is determined that the manned vehicle 40 does not exit the operation area SA (step SP2: No), the procedure returns to step SP1.

In step SP2, in the case where it is determined that the manned vehicle 40 exits the operation area SA (step SP2: Yes), the command signal determination unit 65 determines based on the manipulation on the input device 49 installed in the manned vehicle 40 whether or not a command signal is generated (step SP3). Namely, the command signal determination unit 65 determines whether or not the input device 49 is manipulated by the worker WM.

In step SP3, in the case where it is determined that the command signal is generated, that is, in the case where it is determined that the input device 49 is manipulated (step SP3: Yes), the abnormality monitoring is canceled (step SP10), and the abnormality monitoring is ended.

The command signal generated by the input device 49 includes a request signal of a request for canceling the monitoring abnormality of the abnormality monitoring unit 67. When the worker WM of the manned vehicle 40 intends to allow the manned vehicle 40 to exit the operation area SA, the worker manipulates the input device 49 to request the management device 10 to cancel the abnormality monitoring. In the period when the manned vehicle 40 becomes the management object of the management device 10, the manned vehicle 40 is registered as the management-object manned vehicle in the storage device 13. The abnormality monitoring unit 67 performs the management including the abnormality monitoring on only the manned vehicle 40 registered in the storage device 13. If the abnormality monitoring unit 67 receives the command signal of the input device 49, the abnormality monitoring unit cancels the abnormality monitoring for the manned vehicle 40 where the input device 49 is installed.

In step SP3, in the case where it is determined that a command signal is not generated, that is, in the case where it is determined that the input device 49 is not manipulated (step SP3: No), the alarm device control unit 70 outputs a control signal of activating the alarm device 48 installed in the manned vehicle 40. Therefore, the alarm device 48 is activated (step SP4).

Namely, in the embodiment, when it is determined that the manned vehicle 40 exits the operation area SA to the safety area SB and it is determined that the input device 49 is not manipulated by the worker WM, the alarm device control unit 70 transmits a control signal through the communication system 9 to the manned vehicle 40 to activate the alarm device 48 installed in the manned vehicle 40.

As illustrated in FIG. 14, the display device 48A of the alarm device 48 displays image data representing the operation area SA, image data representing the entrance prohibited area BP, and image data representing the manned vehicle 40. In addition, the display device 48A displays alarm data for prompting the worker WM to manipulate the input device 49. In the example illustrated in FIG. 14, as the alarm data, text data "please input" are displayed on the display device 48A. In addition, the alarm device 48 may output voice data of "please input" as the alarm data by using the voice output device 48B.

The alarm device 48 is activated, so that the worker WM of the manned vehicle 40 can recognize that the worker has neglected the manipulation on the input device 49.

The abnormality monitoring unit 67 cancels the abnormality monitoring for the manned vehicle 40 (step SP5).

The command signal determination unit 65 determines again whether or not a command signal is generated (step SP6).

In step SP6, in the case where it is determined that a command signal is generated, that is, in the case where it is determined that the input device 49 is manipulated (step SP6: Yes), the alarm by the alarm device 48 is canceled (step SP7).

In the case where the abnormality monitoring is canceled, the abnormality monitoring unit 67 notifies a message indicating that the abnormality monitoring is canceled through the communication system 9 to the manned vehicle 40 (step SP8). The abnormality monitoring unit 67 transmits a response signal representing that the abnormality monitoring is canceled through the communication system 9 to the manned vehicle 40.

The response signal transmitted from the management device 10 to the manned vehicle 40 which represents that the abnormality monitoring is canceled is, for example, converted into image data to be displayed on the display device 48A or converted into voice data to be output from the voice output device 48B. The response signal is output through the alarm device 48, so that the worker WM can check that the abnormality monitoring for the manned vehicle 40 driven by the worker WM is canceled and, after that, can exit the operation area SA.

In step SP6, in the case where it is determined that the command signal is not generated, that is, in the case where it is determined the input device 49 is not manipulated (step SP6: No), the abnormality monitoring unit 67 determines whether or not the manned vehicle 40 exits the operation area SA (step SP9).

In step SP9, in the case where it is determined that the manned vehicle 40 exits the operation area SA (step SP6: Yes), the procedure returns to step SP6.

In step SP9, in the case where it is determined that the manned vehicle 40 does not exit the operation area SA (step SP9: No), the procedure proceeds to step SP7.

The manned vehicle 40 exits the operation area SA to the safety area SB and the function of expanding of the entrance prohibited area BP is canceled and the monitoring abnormality of the abnormality monitoring unit 67 is canceled, so that as illustrated in FIG. 13, with respect to the manned vehicle 40 existing in the safety area SB, the entrance prohibited area BP is set to the size in the normal period.

When the exit determination unit 66 determines that the manned vehicle 40 exits the operation area SA to the safety area SB, the entrance prohibited area setting unit 12C cancels the function of expanding of the entrance prohibited area BP. In the case where the manned vehicle 40 exists in the safety area SB, the entrance prohibited area setting unit 12C cancels the function of expanding of the entrance prohibited area BP.

<Function and Effect>

As described heretofore, according to the embodiment, when the manned vehicle 40 existing in the safety area SB exits the operation area SA, the input device 49 is manipulated by the worker WM of the manned vehicle 40, and it is announced that the manned vehicle 40 exits the operation area SA. The command signal generated based on the manipulation on the input device 49 includes the request signal of a request for ending the monitoring abnormality of the abnormality monitoring unit 67. The input device 49 is manipulated, so that the command signal generated based on the manipulation on the input device 49 is transmitted through the communication system 9 to the abnormality monitoring unit 67. The abnormality monitoring unit 67 cancels the abnormality monitoring function based on the command signal from the input device 49 and ends the abnormality monitoring for the manned vehicle 40. Therefore, in the case where the manned vehicle 40 exists in the operation area SA, the safety of the manned vehicle 40 is ensured; and in the case where the manned vehicle 40 exists in the safety area SB, the abnormality monitoring function is prevented from being excessively performed, and thus, reduction in productivity of the mine is suppressed.

Although the manned vehicle 40 exits the operation area SA, if the monitoring by the abnormality monitoring unit 67 continues to be performed, the entrance prohibited area BP is expanded in the abnormal period of the abnormality monitoring of the abnormality monitoring unit 67. In the case where the manned vehicle 40 exits the operation area SA to exist in the safety area SB, there is a sufficiently low possibility that the dump truck 2 and the manned vehicle 40 interfere with each other. Although there is a sufficiently low possibility that the dump truck 2 and the manned vehicle 40 interfere with each other and the safety of the manned vehicle 40 is ensured, in the case where the entrance prohibited area BP is expanded as time elapses in the abnormal period of the abnormality monitoring of the abnormality monitoring unit 67, although the manned vehicle 40 exists in the safety area SB, there is a possibility that a portion of the entrance prohibited area BP protrudes into the operation area SA. Although the manned vehicle 40 exists in the safety area SB and the safety of the manned vehicle 40 is ensured, if a portion of the expanded entrance prohibited area BP protrudes into the operation area SA, due to the entrance prohibited area BP, the dump truck 2 running in the operation area SA needs to decelerate, change the running path, or stop. In this case, the transport work of the dump truck 2 is disturbed, which results in reduction in productivity of the mine. In the embodiment, in the state where the manned vehicle 40 exits the operation area SA to exist in the safety area SB, the abnormality monitoring is canceled, so that the setting of the entrance prohibited area BP as the operation area SA is suppressed. For this reason, the reduction in productivity of the dump truck 2 is suppressed, so that the safety of the manned vehicle 40 is ensured.

According to the embodiment, when it is determined that the manned vehicle 40 exits the operation area SA and the input device 49 is not manipulated, the alarm device 48 installed in the manned vehicle 40 is activated. When the worker intends to allow the manned vehicle 40 to exit the operation area SA, even in the case where the worker WM has neglected the manipulation on the input device 49, the alarm device 48 is activated, so that the worker WM is alerted. The alarm device 48 is activated, so that the worker WM can be prompted to manipulate the input device 49. The input device 49 is manipulated, and thus, the abnormality monitoring is ended, so that the abnormality monitoring function and the function of expanding of the entrance prohibited area BP are prevented from unnecessarily functioning, and the reduction in productivity of the mine is suppressed.

In addition, in the embodiment, when it is determined by the abnormality monitoring function that the abnormality does not occur, the entrance prohibited area BP is set to the size in the normal period; and when it is determined that the abnormality occurs, the entrance prohibited area BP is expanded as time elapses.

In the state where the abnormality is not detected by the abnormality monitoring unit 67, the entrance prohibited area setting unit 12C can surely set the entrance prohibited area BP for protecting the manned vehicle 40 based on the manned vehicle position data. In the state where the abnormality monitoring function normally functions, even in the case where the manned vehicle 40 exists in the operation area SA, interference between the dump truck 2 and the manned vehicle 40 is prevented by the entrance prohibited area BP which is set to the size in the normal period, so that the safety of the manned vehicle 40 is ensured. In addition, the entrance prohibited area BP is set to the size in the normal period, so that reduction in productivity of the dump truck 2 is suppressed. If the entrance prohibited area BP is unnecessarily large, although the possibility of interference with the manned vehicle 40 is low, the dump truck 2 approaching the entrance prohibited area BP needs to decelerate, change the running path, or stop. In the state where the abnormality monitoring function normally functions, the entrance prohibited area BP is set to a necessary minimum size, so that the reduction in productivity of the dump truck 2 is suppressed and the safety of the manned vehicle 40 can be ensured.

On the other hand, in the state where the abnormality is detected by the abnormality monitoring unit 67, that is, in the state where loss of communication by the communication system 9, deterioration in accuracy of detection of the position of the manned vehicle 40 by the position sensor 51, or the like occurs, it is difficult for the entrance prohibited area setting unit 12C of the management device 10 to acquire the manned vehicle position data. In addition, although the manned vehicle position data are acquired, there is a high possibility that the manned vehicle position data are inaccurate. In the case where the entrance prohibited area BP is set based on the inaccurate manned vehicle position data, the actual position of the manned vehicle 40 and the set entrance prohibited area BP are deviated from each other, and thus, a portion of the manned vehicle 40 protrudes to the outside of the entrance prohibited area BP, so that there is a possibility that it is difficult to sufficiently ensure the safety of the manned vehicle 40. In the embodiment, in the state where the manned vehicle 40 exists in the operation area SA and the function of expanding of the entrance prohibited area BP is activated, in the case where the abnormality occurs in the abnormality monitoring function by the abnormality monitoring unit 67, as illustrated in FIG. 12, the entrance prohibited area setting unit 12C expands the entrance prohibited area BP as time elapses. Therefore, the deviation between the actual position of the manned vehicle 40 and the set entrance prohibited area BP and the protrusion of a portion of the manned vehicle 40 to the outside of the entrance prohibited area BP are suppressed. For this reason, even in the case where the manned vehicle 40 exists in the operation area SA, by the entrance prohibited area BP set to the second size, the interference between the dump truck 2 and the manned vehicle 40 is prevented, so that the safety of the manned vehicle 40 is ensured.

In addition, in the embodiment, the entrance prohibited area setting unit 12C reckons the probable existence area where the manned vehicle 40 is likely to exist at a second time point later than a first time point based on the manned vehicle status data at the first time point when the abnormality monitoring function is normal in the abnormal period of the abnormality monitoring function by the abnormality monitoring unit 67. Therefore, although the situation where it is difficult to set the entrance prohibited area BP based on the manned vehicle position data such as loss of communication by the communication system 9 or deterioration in accuracy of detection of the position of the manned vehicle 40 by the position sensor 51 occurs, the entrance prohibited area setting unit 12C reckons the probable existence area of the manned vehicle 40 at a second time point by using the manned vehicle position data at a first time point which the normal period of the abnormality monitoring function without using the manned vehicle position data at the second time point which is the abnormal period of the abnormality monitoring function, so that the entrance prohibited area BP can be set to the added entrance prohibited area BP so as to include the probable existence area. Therefore, the safety of the manned vehicle 40 is ensured.

In addition, in the embodiment, in the state where the input device 49 is not manipulated by the worker WM of the manned vehicle 40, when it is determined based on the manned vehicle position data that the manned vehicle 40 exits the operation area SA, although the abnormality monitoring unit 67 does not receive the command signal of the input device 49, the abnormality monitoring for the manned vehicle 40 is ended. Therefore, even in the case where the alarm device 48 is activated but the worker WM has neglected the manipulation on the input device 49, when the manned vehicle 40 exits the operation area SA, since the abnormality monitoring is ended, the reduction in productivity of the mine is suppressed.

Namely, in the embodiment, although the input device 49 is not manipulated, in the case where the manned vehicle 40 exits the operation area SA, the abnormality monitoring is automatically ended. Therefore, the reduction in productivity of the mine can be sufficiently suppressed. For example, for some reasons such as occurrence of failure of the management system 1 or changing in environment of the mine, the management system fails in the automatic ending of the abnormality monitoring, so that there is a possibility that the abnormality monitoring is not canceled. If the alerting by the alarm device 48 is not performed, there is a possibility that the worker WM allows the manned vehicle 40 to exit the operation area SA without paying attention to the success in the ending of the abnormality monitoring. The alerting by the alarm device 48 is performed, so that the worker WM can pay attention to the success in the ending of the abnormality monitoring. The alerting by the alarm device 48 is performed, and thus, the input device 49 is manipulated, so that the abnormality monitoring is surely ended. In addition, since the worker WM pays attention to the success in the ending of the abnormality monitoring, after the input device 49 is manipulated, in the case where the response signal representing that the abnormality monitoring is ended is not notified from the abnormality monitoring unit 67 or in the case where an error signal representing that the management system fails in the ending of the abnormality monitoring is notified, it is possible to refrain the manned vehicle 40 from exiting the operation area SA. Therefore, the reduction in productivity of the mine is sufficiently suppressed.

In addition, in the embodiment, the entrance prohibited area setting unit 12C sets the entrance prohibited area BP in the case where the manned vehicle 40 exists in each of the operation area SA and the safety area SB. Therefore, the safety of the manned vehicle 40 is ensured. In addition, in the embodiment, in the case where the manned vehicle 40 exists in the operation area SA, the function of expanding of the entrance prohibited area BP is activated, so that the entrance prohibited area BP is expanded in the abnormal period of the abnormality monitoring function. On the other hand, in the case where the manned vehicle 40 exists in the safety area SB, the function of expanding of the entrance prohibited area BP is canceled, the entrance prohibited area BP is not expanded in both of the normal period and abnormal period of the abnormality monitoring function. As described above, in the case where the manned vehicle 40 exists in the safety area SB, there is a sufficiently low possibility that the dump truck 2 and the manned vehicle 40 interfere with each other. Although there is a sufficiently low possibility that the dump truck 2 and the manned vehicle 40 interfere with each other and the safety of the manned vehicle 40 is ensured, in the case where the entrance prohibited area BP is expanded to a second size in the abnormal period of the abnormality monitoring function, although the manned vehicle 40 exists in the safety area SB, there is a possibility that a portion of the entrance prohibited area BP protrudes into the operation area SA. Although the manned vehicle 40 exists in the safety area SB and the safety of the manned vehicle 40 is ensured, if a portion of the expanded entrance prohibited area BP protrudes into the operation area SA, due to the entrance prohibited area BP, the dump truck 2 running in the operation area SA needs to decelerate, change the running path, or stop. In this case, the transport work of the dump truck 2 is disturbed, which results in reduction in productivity of the mine. If the abnormal state is maintained long, the entrance prohibited area BP is expanded as time elapses, and in the extreme case, the entire mine is covered with the entrance prohibited area BP, and thus, all the dump trucks 2 stop running, so that productivity is greatly deteriorated. In the embodiment, in the state where the manned vehicle 40 exists in the safety area SB, the abnormality monitoring is canceled, and the entrance prohibited area BP is set to a necessary minimum first size, so that the entrance prohibited area BP is prevented from being set to the operation area SA. For this reason, the reduction in productivity of the dump truck 2 is suppressed, and the safety of the manned vehicle 40 is ensured.

In addition, although the input device 49 is not manipulated, the registering of the manned vehicle 40 as the management-object manned vehicle is canceled, so that the problem is avoided where the registered manned vehicle 40 exits the operation area SA without permission and the state is maintained.

In addition, according to the embodiment, when the abnormality monitoring is ended, the abnormality monitoring unit 67 notifies the response signal representing the abnormality monitoring is ended to the manned vehicle 40. Therefore, after the worker checks that the safety management is ended, the worker WM can allow the manned vehicle 40 to exit the operation area SA. In addition, in the state where the safety monitoring is enabled, the manned vehicle 40 is prevented from moving away from the operation area SA. Therefore, the reduction in productivity is suppressed, and the safety of the manned vehicle 40 is ensured.

In addition, in the embodiment, in the initial state where the communication of the communication system 9 is established, the entrance prohibited area BP is set to the size in the normal period, and in the abnormal period of the abnormality monitoring function, the entrance prohibited area is expanded as time elapses. The size of the entrance prohibited area BP in the initial state may be changed by the manipulation on the input device 49 of the manned vehicle 40 or may be changed by the manipulation of the input device 17 of the management device 10. The worker WM or the manager can select the size of the entrance prohibited area BP in the initial state according to the situation of the mine.

Other Embodiments

Figure 15:
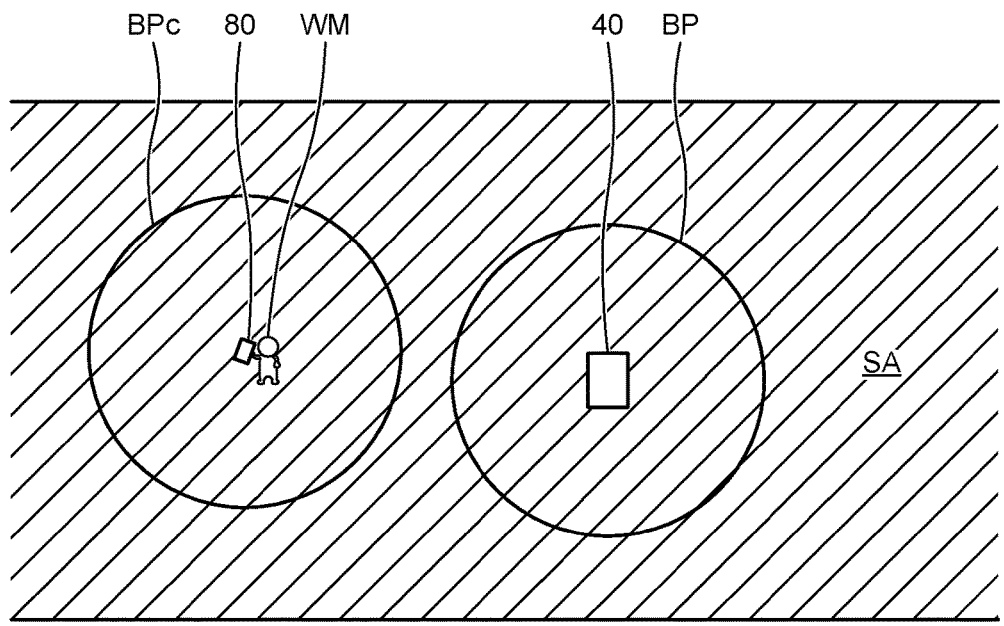
FIG. 15 is a schematic diagram illustrating an example of a mine managing method according to the embodiment.
Figure 16:
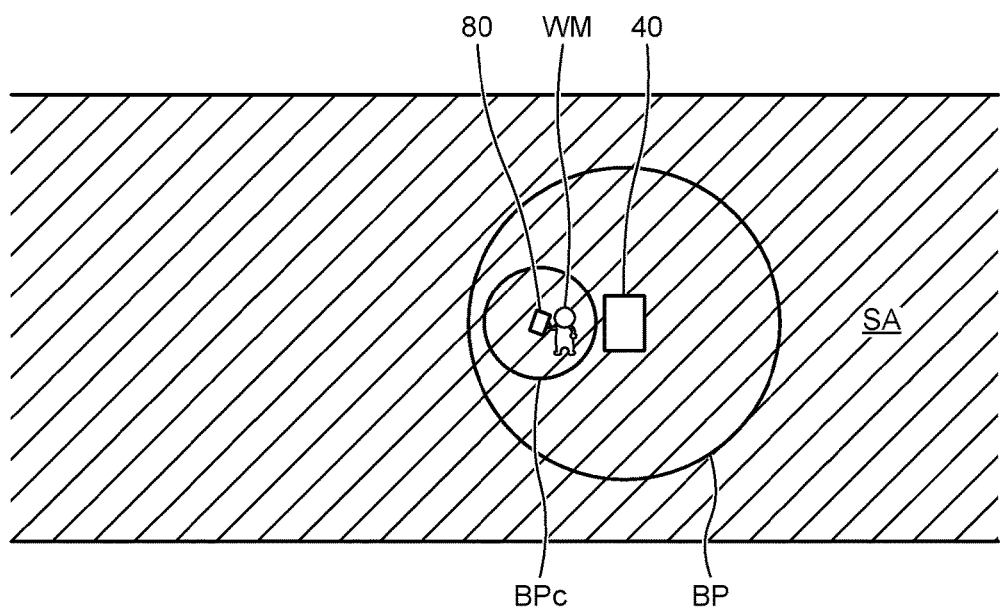
FIG. 16 is a schematic diagram illustrating an example of a mine managing method according to the embodiment.

In addition, in the above-described embodiment, it is configured that the moving body which is different from the dump truck 2 is the manned vehicle 40. The moving body which is different from the dump truck 2 may be a mobile device held by the worker WM. FIGS. 15 and 16 are schematic diagram illustrating examples of a mobile device 80 as the moving body which is different from the dump truck 2. The mobile device 80 moves in the mine in the state where the mobile device 80 is held by the worker WM.

The mobile device 80 is configured to include a position sensor which includes a GPS receiver, an input device, a wireless communication device which can communicate with the management device 10 in a wireless manner, an alarm device which includes at least one of a display device and a voice output device, and a mobile device control device. The position sensor of the mobile device 80 has a function equivalent to that of the position sensor 51 of the manned vehicle 40. The input device of the mobile device 80 has a function equivalent to that of the input device 49 of the manned vehicle 40. The wireless communication device of the mobile device 80 has a function equivalent to that of the wireless communication device 52 of the manned vehicle 40. The alarm device of the mobile device 80 has a function equivalent to that of the alarm device 48 of the manned vehicle 40. The mobile device control device of the mobile device 80 has a function equivalent to that of the manned vehicle control device 60 of the manned vehicle 40.

For example, when the communication between the mobile device 80 and the management device 10 of the management system 1 is established, the entrance prohibited area BPc is set so as to include the position of the mobile device 80. Therefore, as illustrated in FIG. 15, even in the case where the worker WM alights from the manned vehicle 40 which enters the operation area SA and the worker WM holding the mobile device 80 exists in the outer area of the entrance prohibited area BP set for the manned vehicle 40 (the area of the operation area SA where the entrance prohibited area BP is not set), the safety of the worker WM holding the mobile device 80 is ensured.

In addition, in the state where the mobile device 80 (worker WM) exists in the outer area of the entrance prohibited area BP, the monitoring abnormality of the abnormality monitoring unit 67 is performed on the mobile device 80, and the function of expanding the entrance prohibited area BPc is set. When the abnormality monitoring unit 67 determines by the abnormality monitoring function that the abnormality does not occur, the entrance prohibited area BPc set with respect to the mobile device 80 is maintained to the size in the normal period. When the abnormality monitoring unit 67 determines by the abnormality monitoring function that the abnormality occurs, the entrance prohibited area BPc set with respect to the mobile device 80 is expanded from the size in the normal period as time elapses. Therefore, the safety of the worker WM holding the mobile device 80 is ensured.

The worker WM holding the mobile device 80 exits the outer area of the entrance prohibited area BP to enter the entrance prohibited area BP in order to board the manned vehicle 40 and manipulates the input device of the mobile device 80. Therefore, the abnormality monitoring for the mobile device 80 by the abnormality monitoring unit 67 is ended.

In addition, when it is determined based on the position data of the mobile device 80 that the mobile device 80 exits the outer area of the entrance prohibited area BP to move into the entrance prohibited area BP, the entrance prohibited area setting unit 12C cancels the function of expanding the entrance prohibited area BPc.

When it is determined that the mobile device 80 exits the outer area of the entrance prohibited area BP and the input device of the mobile device 80 is not manipulated, the alarm device control unit 70 transmits an activation signal of activating the alarm device of the mobile device 80 to the mobile device 80. Therefore, the alarm device of the mobile device 80 is activated, so that the worker WM can be prompted to manipulate the input device of the mobile device 80.

Figure 17:
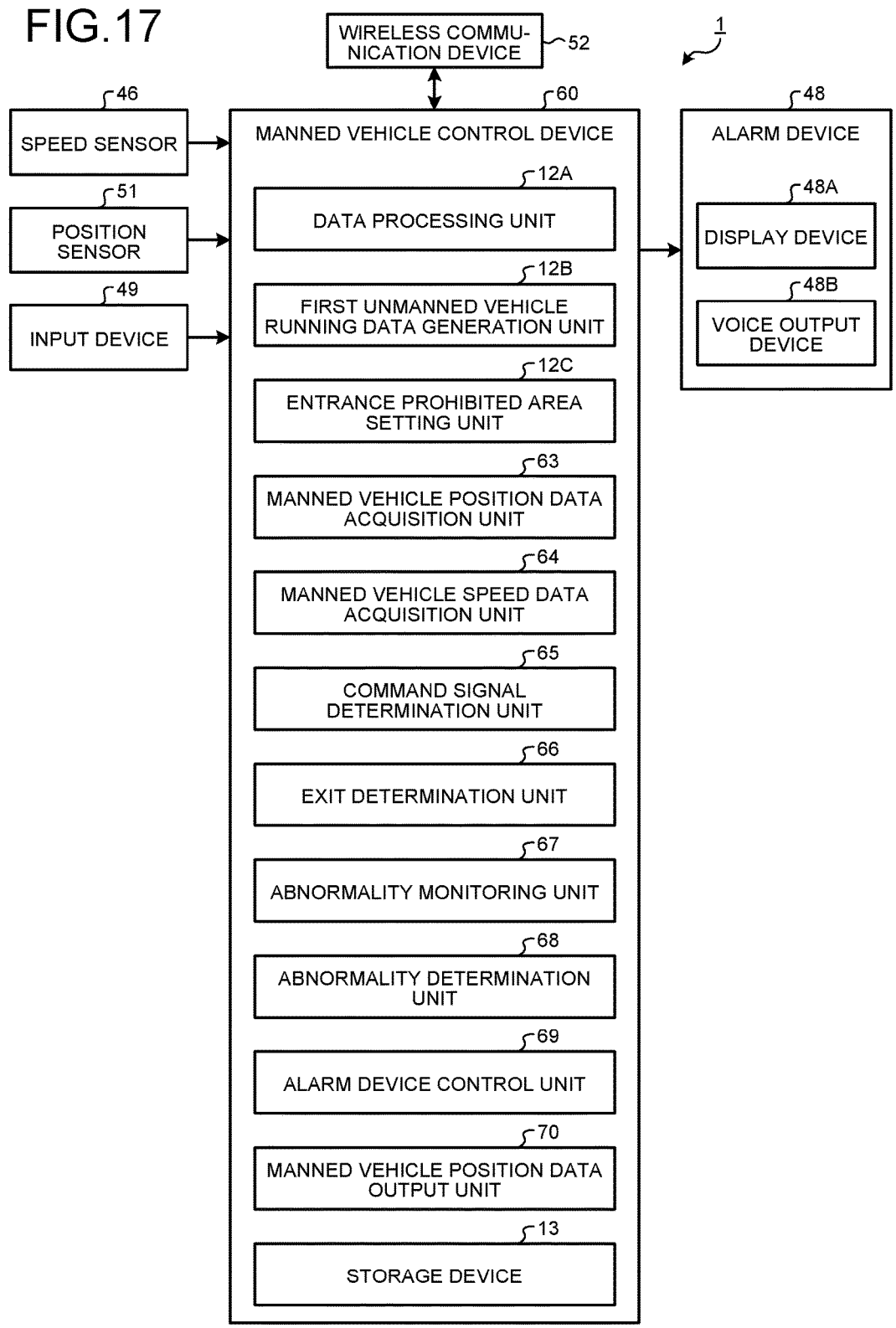
FIG. 17 is a functional block diagram illustrating an example of a manned vehicle according to the embodiment.

In addition, in each of the above-described embodiments, the functions of the data processing unit 12A, the first unmanned vehicle running data generation unit 12B, the entrance prohibited area setting unit 12C, the manned vehicle position data acquisition unit 63, the manned vehicle speed data acquisition unit 64, the command signal determination unit 65, the exit determination unit 66, the abnormality monitoring unit 67, the abnormality determination unit 68, the alarm device control unit 70, the storage device 13, and the like are configured to be installed in the management device 10. As illustrated in FIG. 17, these functional units may be installed in the manned vehicle 40 (manned vehicle control device 60) or may be installed in the mobile device 80 (mobile device control device). Namely, in the above-described embodiments, the management system 1 may be installed in the control facility 8 or may be installed in a moving body including at least one of the manned vehicle 40 and the mobile device 80.

In addition, in the above-described embodiments, it is configured that the position data of the moving body (manned vehicle 40 or mobile device 80) are acquired by the position sensor including the GPS receiver. For example, in the case where the access road is connected to the haul road HL, a signal terminal is installed in the access road, and at the time when the communication between the signal terminal and the moving body is established, the position of the moving body may be acquired as the position data of the moving body in the access road.

In addition, in each of the above-described embodiments, the time point when the moving body is determined to exit the operation area SA may be a time point when the moving body is determined to exit the operation area SA, a time point when a threshold value of elapsing time elapses after the moving body exits the operation area SA, or a time point when a distance between the moving body approaching the operation area SA in the safety area SB and the operation area SA is threshold value or less based on the moving body position data acquired by the moving body position data acquisition unit.

The components of the above-described embodiments include things that can be easily considered by the ordinarily skilled in the art, things that are substantially the same, and things within the so-called range of equivalents. In addition, the components of the above-described embodiments may be appropriately combined. In addition, in some cases, a portion of the components may not be used.

REFERENCE SINGS LIST

1 MANAGEMENT SYSTEM
2 DUMP TRUCK (UNMANNED VEHICLE)
3 VEHICLE
4 VESSEL
5 DRIVING DEVICE
6 VEHICLE BODY
7 POWER GENERATING DEVICE
8 CONTROL FACILITY
9 COMMUNICATION SYSTEM
10 MANAGEMENT DEVICE
11 COMPUTER SYSTEM
12 PROCESSING DEVICE
12A DATA PROCESSING UNIT
12B FIRST UNMANNED VEHICLE RUNNING DATA GENERATION UNIT
12C ENTRANCE PROHIBITED AREA SETTING UNIT
13 STORAGE DEVICE
13B DATABASE
15 INPUT/OUTPUT UNIT
16 DISPLAY DEVICE
17 INPUT DEVICE
18 WIRELESS COMMUNICATION DEVICE
20 WHEEL

21 AXLE
22 BRAKE DEVICE
23 STEERING DEVICE
24 NON-CONTACT SENSOR
25 STORAGE DEVICE
25B DATABASE
26 GYRO SENSOR
27 SPEED SENSOR
28 POSITION SENSOR
28A ANTENNA
29 WIRELESS COMMUNICATION DEVICE
29A ANTENNA
30 UNMANNED VEHICLE CONTROL DEVICE
30A SECOND UNMANNED VEHICLE RUNNING DATA GENERATION UNIT
40 MANNED VEHICLE
41 DRIVING DEVICE
42 WHEEL
43 POWER GENERATING DEVICE
43A ACCELERATOR MANIPULATION UNIT
44 BRAKE DEVICE
44A BRAKE MANIPULATION UNIT
45 STEERING DEVICE
45A STEERING MANIPULATION UNIT
46 SPEED SENSOR
48 ALARM DEVICE
48A DISPLAY DEVICE
48B VOICE OUTPUT DEVICE
49 INPUT DEVICE
50 VEHICLE BODY
51 POSITION SENSOR
51A ANTENNA
52 WIRELESS COMMUNICATION DEVICE
52A ANTENNA
60 MANNED VEHICLE CONTROL DEVICE
63 MANNED VEHICLE POSITION DATA ACQUISITION UNIT
64 MANNED VEHICLE SPEED DATA ACQUISITION UNIT
65 COMMAND SIGNAL DETERMINATION UNIT
66 EXIT DETERMINATION UNIT
67 ABNORMALITY MONITORING UNIT
68 ABNORMALITY DETERMINATION UNIT
70 ALARM DEVICE CONTROL UNIT
80 MOBILE DEVICE
AP RUNNING ALLOWED AREA
BP ENTRANCE PROHIBITED AREA
DPA DUMPING SITE
HL HAUL ROAD
LM LOADING MACHINE
LPA LOADING SITE
SA OPERATION AREA
SB SAFETY AREA
ST GPS SATELLITE
WM WORKER

The invention claimed is:

1. A mine management system for a mine where an unmanned vehicle operates in an operation area of the mine, comprising:

an exit determination unit which determines based on position data of a moving body which is different from the unmanned vehicle whether or not the moving body exits the operation area;

an abnormality monitoring unit which ends monitoring abnormality of the moving body based on manipulation on an input device installed in the moving body;

an entrance prohibited area setting unit which sets an entrance prohibited area where entrance of the unmanned vehicle is prohibited so that the entrance prohibited area includes a position of the moving body and expands the entrance prohibited area when an abnormality is detected by the abnormality monitoring; and an alarm device control unit which activates an alarm device installed in the moving body when it is determined that the moving body exits the operation area and the input device is not manipulated.

2. The mine management system according to claim 1, wherein when an abnormality is detected by the abnormality monitoring, the entrance prohibited area setting unit reckons a probable existence area of the moving body to expand the entrance prohibited area.

3. The mine management system according to claim 1, wherein when it is determined that the moving body exits the operation area, the abnormality monitoring unit ends the abnormality monitoring.

4. The mine management system according to claim 1, wherein when the moving body exists in a safety area, the entrance prohibited area setting unit cancels a function of expanding the entrance prohibited area.

5. The mine management system according to claim 1, wherein the abnormality monitoring unit notifies to the moving body a message indicating that the abnormality monitoring is ended.

6. A mine managing method by a computer system for a mine where an unmanned vehicle operates in an operation area of the mine, comprising:

acquiring position data of a moving body which is different from the unmanned vehicle;

setting an entrance prohibited area where entrance of the unmanned vehicle is prohibited so that the entrance prohibited area includes a position of the moving body;

determining based on the position data whether or not the moving body exits the operation area;

acquiring a command signal generated based on manipulation on an input device installed in the moving body;

ending monitoring abnormality of the moving body based on the command signal;

expanding the entrance prohibited area when an abnormality is detected by the abnormality monitoring; and outputting a control signal of activating an alarm device installed in the moving body when it is determined that the moving body exits the operation area and the input device is not manipulated.

* * * * *